United States Patent
Ciocarlie et al.

(10) Patent No.: US 11,729,196 B2
(45) Date of Patent: Aug. 15, 2023

(54) MODELING CYBER-PHYSICAL ATTACK PATHS IN THE INTERNET-OF-THINGS

(71) Applicant: SRI International, Menlo Park, CA (US)

(72) Inventors: Gabriela F. Ciocarlie, New York, NY (US); Ioannis Agadakos, Jersey City, NJ (US); Chien-Ying Chen, Champaign, IL (US); Matteo Campanelli, Brindisi (IT); Prashant Anantharaman, Hanover, NH (US); Monowar Hasan, Champaign, IL (US); Ulf Lindqvist, San Luis Obispo, CA (US); Michael Locasto, Lebanon, NJ (US); Bogdan Copos, Palo Alto, CA (US); Tancrède Lepoint, New York, NY (US); Matthew Filippone, Barnegat, NJ (US)

(73) Assignee: SRI International, Menlo Park, CA (US)

( * ) Notice: Subject to any disclaimer, the term of this patent is extended or adjusted under 35 U.S.C. 154(b) by 717 days.

(21) Appl. No.: 16/634,591

(22) PCT Filed: Aug. 13, 2018

(86) PCT No.: PCT/US2018/046499
§ 371 (c)(1),
(2) Date: Jan. 28, 2020

(87) PCT Pub. No.: WO2019/036365
PCT Pub. Date: Feb. 21, 2019

(65) Prior Publication Data
US 2020/0162500 A1     May 21, 2020

Related U.S. Application Data

(60) Provisional application No. 62/544,774, filed on Aug. 12, 2017.

(51) Int. Cl.
*H04L 9/00*     (2022.01)
*H04L 9/40*     (2022.01)
*H04L 41/14*     (2022.01)

(52) U.S. Cl.
CPC ........ *H04L 63/1433* (2013.01); *H04L 41/145* (2013.01); *H04L 63/1416* (2013.01)

(58) Field of Classification Search
CPC   H04L 63/1433; H04L 63/1416; H04L 41/145
(Continued)

(56) References Cited

U.S. PATENT DOCUMENTS 8,307,444 B1 *  11/2012  Mayer ................... H04L 67/125
726/25
2015/0106941 A1   4/2015  Muller et al.
(Continued)

OTHER PUBLICATIONS

Chowdhury et al., "Modelling Cyber Attacks"; International Journal of Network Security & Its Applications (INSA); Jul. 2017; Retrieved from <http://airconline.com/ijnsa/V9N4/9417ijnsa02.PDF> entire document.
(Continued)

*Primary Examiner* — Christopher J Brown
(74) *Attorney, Agent, or Firm* — Moser Taboada

(57) ABSTRACT

A method, apparatus and system for determining a weakness or risk for devices of an Internet-of-things (IoT) network include determining a representation of a physical environment of the IoT network and expected physical and cyber interactions between the devices of the IoT network based at least in part on operating characteristics of the devices of the IoT network, monitoring the physical environment and actual interactions between the devices to generate a network model including at least one of uncharacteristic physical or cyber interaction paths between the devices, based on the determined network model, determining at least one weakness or risk of at least one of the IoT network or of at
(Continued)

least one of the devices, and providing a metric of security of at least one of the IoT network or of at least one of the devices based on at least one of the determined weakness or risk.

22 Claims, 12 Drawing Sheets

(58) Field of Classification Search
USPC .......................................................... 726/25
See application file for complete search history.

(56) References Cited

U.S. PATENT DOCUMENTS

| 2016/0179962 | A1 | 6/2016 | Patten et al. | |
|---|---|---|---|---|
| 2016/0301707 | A1* | 10/2016 | Cheng | H04L 67/12 |
| 2016/0315955 | A1* | 10/2016 | Beatty | H04L 63/1425 |
| 2016/0342791 | A1 | 11/2016 | Aguayo Gonzalez et al. | |
| 2017/0220801 | A1* | 8/2017 | Stockdale | H04L 63/1433 |
| 2018/0012020 | A1* | 1/2018 | Prvulovic | G06F 1/28 |

OTHER PUBLICATIONS

Ning et al., "Cyber-entity security in the Internet of things."; Computer. Mar. 7, 2013; Retrieved from <http//www.cybermatics.org/SmartWorldCongress2015/SWC2015/SWRelatedInfo/files/Cyberenity%20Security%20in%20the%20Internet%20of%20Things.pdf> entire document.

Pan et al., "Taxonomies for Reasoning About Cyber-physical Attacks in IoT-based Manufacturing Systems"; International Journal of Interactive Multimedia & Artificial Intelligence; Mar. 2017; Retrieve from <http://www.dre.vanderbilt.edu/—schmidt/PDF/SITaxonomies-finalwithBio.pdf> entire document.

International Search Report dated Oct. 19, 2018 for PCT Application No. PCT/US2018/046499.

* cited by examiner

| DIAGRAM | IN/OUT | RATIO |
|---|---|---|
| APACHE | 13 / 8 | 1.63 |
| SENDMAIL | 13 / 9 | 1.44 |
| SENDMAIL X | 20/12 | 1.67 |
| QMAIL | 21/13 | 1.62 |
| POSTGRESQL | 29/16 | 1.81 |
| MYSQL | 24/13 | 1.85 |
| BERKELEYDB | 10/11 | 1.64 |
| POSTFIX | 17/12 | 1.42 |
| OPENBGPD | 23/11 | 2.09 |
| OPENNTPD | 10/7 | 1.42 |
| OPENSSH | 18/11 | 1.63 |
| OPENTMUX | 14/9 | 1.56 |
| NGINX | 7/7 | 1.00 |

FIG. 7

| | | |
|---|---|---|
| Option 1 | Replace your Smart Lock with a secure type | Sugested \| Good |
| Option 2 | Move your Smart Lock to an indoor place.<br>We recommend switching the location for the following device<br><br>Kevo-Kwikset | Good |
| Option 3 | Disable Wi-Fi on your Smart Lock and enable cryptographically secure Bluetooth | Not Recommended |

Closed | Resolved

MODELING CYBER-PHYSICAL ATTACK PATHS IN THE INTERNET-OF-THINGS

FIELD

Embodiments of the present principles generally relate to assessing cyber and physical interactions between internet-of-things devices and more specifically to methods, apparatuses and systems for modeling cyber and/or physical attack paths in networks including internet-of-things devices.

BACKGROUND

The proliferation of Internet-of-Things (IoT) devices within homes and businesses raises security and privacy concerns. There exists a lack of effective security mechanisms in IoT devices. Cyber security researchers advise that many of the witnessed attacks are low-hanging fruit and represent only a glimpse into the future of IoT cyber attacks. The combination of the dynamic nature of IoT networks and the proliferation of interactions between devices as the number of devices increases makes it difficult to identify dangerous scenarios or determine how the security of the IoT network is affected by a change in the architecture of a network, such as the addition of a new device.

There is a need to be able to identify and model cyber and physical interactions/interconnections between IoT devices in networks for determining a vulnerability of the IoT devices connected to the Internet.

SUMMARY

Embodiments of methods, apparatuses and systems for modeling cyber and/or physical interactions/interconnections between IoT devices in networks for determining a vulnerability of the IoT devices connected to the Internet are disclosed herein.

In some embodiments a method for determining a weakness or risk for devices of an Internet-of-things (IoT) network, includes determining a representation of a physical environment of the IoT network and expected physical and cyber interactions between the devices of the IoT network based at least in part on operating characteristics of the devices of the IoT network, monitoring the physical environment and actual interactions between the devices of the IoT network to generate a network model including at least one of uncharacteristic physical or cyber interaction paths between the devices of the IoT network over which physical or cyber interactions can potentially occur, based on the determined network model, determining at least one weakness or risk of at least one of the IoT network or of at least one of the devices of the IoT network, and providing a metric of security of at least one of the IoT network or of at least one of the devices of the IoT network based on at least one of the determined weakness or risk In some embodiments, an apparatus for determining a weakness or risk for devices of an Internet-of-things (IoT) network includes a processor, and a memory coupled to the processor, the memory having stored therein at least one of programs or instructions executable by the processor. In such embodiments, when the programs or instruction are executed by the processor, the apparatus is configured to determine a representation of a physical environment of the IoT network and expected physical and cyber interactions between the devices of the IoT network based at least in part on operating characteristics of the devices of the IoT network, monitor the physical environment and actual interactions between the devices of the IoT network to generate a network model including at least one of uncharacteristic physical or cyber interaction paths between the devices of the IoT network over which physical or cyber interactions can potentially occur, based on the determined network model, determine at least one weakness or risk of at least one of the IoT network or of at least one of the devices of the IoT network, and provide a metric of security of at least one of the IoT network or of at least one of the devices of the IoT network based on at least one of the determined weakness or risk.

In some embodiments, a system for determining a weakness or risk for devices of an Internet-of-things (IoT) network includes at least one sniffer to determine operating characteristics of the Internet devices of the network and an apparatus comprising a processor and a memory coupled to the processor, the memory having stored therein at least one of programs or instructions. In such embodiments, when the programs or instruction are executed by the processor, the apparatus is configured to determine a representation of a physical environment of the IoT network and expected physical and cyber interactions between the devices of the IoT network based at least in part on operating characteristics of the devices of the IoT network, monitor the physical environment and actual interactions between the devices of the IoT network to generate a network model including at least one of uncharacteristic physical or cyber interaction paths between the devices of the IoT network over which physical or cyber interactions can potentially occur, based on the determined network model, determine at least one weakness or risk of at least one of the IoT network or of at least one of the devices of the IoT network, and provide a metric of security of at least one of the IoT network or of at least one of the devices of the IoT network based on at least one of the determined weakness or risk.

In some embodiments, a non-transitory computer-readable storage device includes stored thereon a plurality of instructions, the plurality of instructions including instructions which, when executed by a processor, cause the processor to perform a method for determining a weakness or risk for devices of an Internet-of-things (IoT) network, which includes determining a representation of a physical environment of the IoT network and expected physical and cyber interactions between the devices of the IoT network based at least in part on operating characteristics of the devices of the IoT network, monitoring the physical environment and actual interactions between the devices of the IoT network to generate a network model including at least one of uncharacteristic physical or cyber interaction paths between the devices of the IoT network over which physical or cyber interactions can potentially occur, based on the determined network model, determining at least one weakness or risk of at least one of the IoT network or of at least one of the devices of the IoT network, and providing a metric of security of at least one of the IoT network or of at least one of the devices of the IoT network based on at least one of the determined weakness or risk.

Other and further embodiments of the present principles are described below.

BRIEF DESCRIPTION OF THE DRAWINGS

Embodiments of the present principles, briefly summarized above and discussed in greater detail below, can be understood by reference to the illustrative embodiments of the principles depicted in the appended drawings. However, the appended drawings illustrate only typical embodiments of the present principles and are therefore not to be considered limiting of scope, for the present principles may admit to other equally effective embodiments.

FIG. 7 depicts trust relationships in 13 real-world pieces of software with respect to TDDs in accordance with an embodiment of the present principles.

Figure 1:
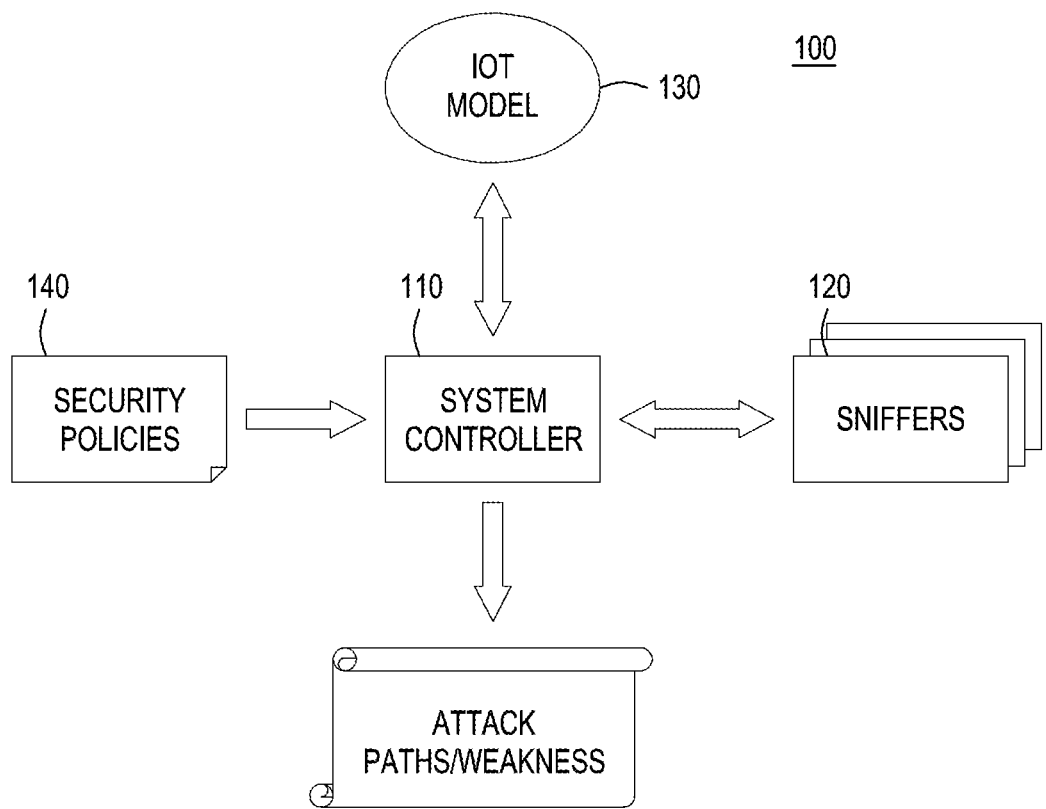
FIG. 1 depicts a high level structural diagram of a system for modeling an IoT network(s) and determining potential vulnerabilities in the IoT network(s) in accordance with an embodiment of the present principles.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

In the following description, numerous specific details are set forth in order to provide a thorough understanding of exemplary embodiments or other examples described herein. However, these embodiments and examples may be practiced without the specific details. In other instances, well-known methods, procedures, components, and/or circuits have not been described in detail, so as not to obscure the following description. Further, the embodiments disclosed are for exemplary purposes only and other embodiments may be employed in lieu of, or in combination with, the embodiments disclosed. For example, although embodiments of the present principles are described with respect to specific IoT devices and other specific hardware and software, other hardware devices and software means capable of communicating over the internet or other network intercommunication means can be implemented in accordance with various embodiments of the present principles.

Embodiments in accordance with the present principles provide methods, apparatuses and systems for modeling cyber and/or physical interactions/interconnections between internet-of-things (IoT) devices in networks for determining a vulnerability of the IoT devices connected to the Internet. In various embodiments, by verifying the modeled cyber and/or physical interactions between internet-of-things (IoT) devices against user-defined policies, unexpected chains of events can be identified that may be harmful. The modeling and verification in accordance with the present principles can also be used to identify possible sources of the harmful events and the modeling can also be applied to determine the impact of the addition (or removal) of an IoT device, or other device, into an existing network.

The terms weakness or risks and derivations of the term are used throughout the teachings of the present disclosure. In some embodiments, the terms weakness or risks and derivations are intended to describe and define any weakness and/or point of risk in an IoT device and/or an IoT network, such as an unexpected/uncharacteristic communications path or channel (i.e., attack path) in an IoT network and/or between IoT device of the IoT network, an anomaly in the functionality of an IoT device and/or an IoT network, a cause of a weakness in an IoT device and/or IoT network, either within the IoT network or outside of the IoT network, a risk of an intended control of an IoT device and/or IoT network, either within the IoT network or outside of the IoT network, software and/or network vulnerabilities and the like.

The term "attack path" and derivations of the term are used throughout the teachings of the present disclosure. In some embodiments the term "attack path" and the derivations are intended to describe and define an unexpected communication path/channel with an IoT network and/or between IoT devices of an IoT network over which unauthorized physical and/or cyber interactions can potentially occur.

The term "security" is used throughout the teachings of the present disclosure. In some embodiments, the term "security" is intended to describe and define an intention/ability of a device or network to resist attacks, such as unauthorized communications. Similarly, the phrase "security posture" is intended to describe and define a security status of an IoT device or an IoT network.

The term "privacy" is used throughout the teachings of the present disclosure. In some embodiments, the term "privacy" is intended to describe and define a measure of how secure is a user's personal information or other information a user intends to keep private. Similarly, the phrase "security posture" is intended to describe and define a privacy status of an IoT device or an IoT network.

While IoT devices are similar in nature to cyber-physical systems, some characteristics are unique to this class of devices.

Software Components.

Interactions between devices are driven by software external to the devices and can often change. For example, in some environment, the interactions between devices are defined by smart-apps. These applications can be added and removed by users over time. The addition (or removal) of new devices also introduces changes in the interactions between devices.

Channel Projection.

The closely intertwined software and hardware grant IoT systems a unique ability to seamlessly project from the physical world to the cyber world. A device, such as a smart thermostat, can receive commands from a smartphone, which can trigger actions that impact the physical environment (e.g., turn the AC on).

Ad Hoc Interoperability.

IoT devices can affect each other in adhoc ways, and can be configured in unforeseen setups. Interoperability implies that the security of a device is defined by its peers and the interactions between devices. For example, when a smart device, such as a smart electric plug, is installed in series with a smart hub, even if the smart hub is properly secured, the behavior of the smart hub can be influenced by the insecure smart device. More concisely, vulnerabilities can be introduced by composition of devices, regardless of the security of each individual device.

To capture the complicated interactions between devices, the inventors propose a way of modeling using an expressive language for describing complex structures. In some embodiments in accordance with the present principles, Alloy can be implemented to accomplish the modeling. Alloy is an open source language and analyzer for software modeling and describing complex structures. Paired with a model checker, Alloy can be used to model various systems and to identify all potential interactions between devices based on their capabilities, and not just the ones defined by the software stack. In other embodiments in accordance with the present principles, Prolog can be implemented to accomplish the modeling. Alloy and Prolog differ in expressiveness and theorem-proving strategies. Unlike Alloy, Prolog implements only a subset of First Order Logic. Prolog uses a depth-first search approach to theorem proving while Alloy uses an underlying SAT solver. Prolog's backtracking approach can be advantageous in terms of performance, with immediate response even when querying a network with billions of states or devices.

In a model in accordance with embodiments of the present principles, an entity can be defined as being either abstract or concrete, which enables inheritance-like abilities. For example, a device can be either and actuator or a sensor. For developing a model of an IoT network, Facts are defined as universal truths about how things operate in a described universe (e.g., network). For example, devices can be defined as being either OFF or ON. The use of implications guarantees that it is not possible for a device to be both ON and OFF. It is also possible to define the symmetric relationships as having adjacency. This means that if location A is adjacent to location B, then location B is adjacent to location A.

Because Facts are defined as axioms that are always true, then Assertions can be considered theorems that should be provably true based on the supplied facts and the provided inputs. If an Assertion is not true, the model checker searches for counterexamples. Users are able to define Assertions of various complexity, from simple sanity/policy checks to more complicated logic scenarios that could reveal a source of weakness or risks or an attack path.

Predicates are statements that, like Assertions, are verified given the facts and inputs provided. In contrast to Assertions, Predicates provide a possible solution as derived from the model.

For modeling an IoT network and devices, in some embodiments the focus is on the interactions between the devices. Specifically, how IoT devices are correlated and how the IoT devices interact with each other are determined. Typically, assessments of system interactions consider only network connections established by wired or wireless channels; however, both cyber and physical aspects play an important role in IoT networks and in the modeling in accordance with the present principles. That is in various embodiments, a model of an IoT network encodes the semantics of both the physical environment (details and dimensions of the space containing the devices) and what the sensing and actuation capabilities of the devices are.

In embodiments of network and device modeling in accordance with the present principles, a device is defined as an instance of an electronic device deployed in an IoT network. The device can be defined as simply as a sensing device (e.g., temperature sensors, light sensors), an actuator (e.g., thermostat, oven) or as sophisticated as a commodity computer (e.g., laptops, IoT hubs). Each device is characterized by a physical location and supported input/output channels, as defined by the device hardware capabilities. Although, in some embodiments described herein, the devices are described as being defined manually, the information can be gathered from device descriptions and the definitions can be automated.

In some embodiments in accordance with the present principles, a model does not differentiate between device roles (i.e., sensors, coordinators, and actuators). Such flexibility enables a capture and determination of all possible cyber and physical relations between devices. While software controlling the devices may forbid some interactions, treating all devices (and roles) equally provides a more unrestricted ability to determine all potential attack paths (i.e., vulnerabilities) in a more general way and realize the value gained by comparing a worst-case scenario to a more realistic approach. One approach to determine all potential attack paths includes determining if there is a possibility of any communication between a pair of devices and then to assess a probability of influence through either a direct IT communications channel or a physical environmental property. That is, the existence of any unexpected or surprising interactions as a result of any interaction between devices including but not limited to audio, light (e.g., visible light, infrared), temperature, pressure, and/or physical interaction/movement is identified. In some embodiments, known vulnerabilities related to the cyber properties of a device (outdated software, open ports, presence of a known vulnerability, weak/missing authentication credentials) can be considered along with the physical capabilities of the device to determine all potential attack paths (i.e., vulnerabilities).

A network device, such as an IoT device, can have multiple channels via its input and output interfaces that enable interactions. An IoT network model in accordance with the present principles considers both cyber and physical channels. For example, Wi-Fi, Bluetooth, ZigBee, and Z-Wave are typical examples of cyber channels used in IoT devices. Temperature, humidity, voice, and vibration are examples of physical channels that are often affected by IoT devices. The IoT network model can also include policies (e.g., security policies) that define constraints on the interactions between devices based on the physical proximity of devices. Devices having a common interface and located within an effective range can interact with each other. For example, a Bluetooth-enabled lock can interact with a smartphone via a Bluetooth channel when they are within Bluetooth signal range. An air conditioning unit producing cold air cools down room temperature, which is sensed by a temperature sensor. A temperature channel connects the air conditioning unit and the temperature sensor. In contrast, a smart light has no temperature channel connected with the air conditioning unit as a light sensor of the smart light is not influenced by the air conditioning. A device typically does not have a channel in common with any other device if the corresponding interface is not supported. For instance, Amazon Echo™ cannot establish a ZigBee™ channel with any other device because Amazon Echo™ does not support ZigBee™.

Some embodiments of an IoT network model in accordance with the present principles also include various notions of security. Particularly, because a principal focus of the model in at least some embodiments is on the interactions between devices on various channels, a degree of authentication for each channel is considered. It should be noted, however, that a device that communicates with other devices via unauthenticated channels can potentially serve as a stepping stone to an otherwise properly configured network. In some embodiments, a model in accordance with the present principles defines at least three authentication levels for a given channel: strong-authentication, weak-authentication or no-authentication.

Strong-authentication represents a channel that is usually considered hard to attack from a security perspective. For example, a Wi-Fi channel with WPA2-PSK enabled is considered to have strong-authentication. Weak-authentication suggests that a channel has some degree of authentication but is likely to be compromised by a smart attacker. For example, Apple's intelligent personal assistant, Siri™, receives commands via an acoustic channel from a voice that is recognized (after a training process). A smart attacker could record the user's voice and activate Siri™ unexpectedly.

No-authentication indicates that no authentication mechanism is applied to the given channel. Most physical channels are unauthenticated. For example, the temperature channel between an air conditioner and a thermostat is not enforced by any authentication methods.

In various embodiments, authentication is defined and modeled as a relationship between Channel→Authentication on a per device basis. Such an approach enables each device's capability to be expressed and defined in a fine grained manner.

As described above, in many IoT network environments, the physical location of devices can be important. For example, personal assistance devices, such as Amazon's Echo™, should not be placed close to windows or outside walls, as the device could pick up voice commands from individuals outside of the intended use area, such as from outside of the building.

For example, in some embodiments of a model in accordance with the present principles, the following Access entities can be defined: public, private, and protected. More types of Access entities can be defined as needed in other embodiments. A hierarchical order of the Access types can also be assumed in some embodiments. For example, an entity that can access a private area may also be able to access a Protected area and Public areas.

Public-access locations can be defined as accessible by the general public (such as doorway, backyard and hallway). A device deployed in a public location without protection is susceptible to attackers within reach. Private-access locations can be defined as well protected areas (or isolated from outsiders) such as bedrooms, private garages and document storage rooms in office buildings. Protected-access locations can be defined as locations such as the common areas in an apartment building protected by a doorman, where despite screening processes, devices are at risk in the presence of malicious visitors.

While locations are used to determine the accessibility of devices, the proximity between devices is also important. For example, a Bluetooth-equipped device in a Private location could be susceptible to attacks depending on the range of the Bluetooth and the capabilities of the attacker's hardware. Such a concept is captured by some embodiments of a model in accordance with the present principles by establishing a fact which defines that a device (or attacker) can only interact with another device through a channel if it is within the range defined by the channel. For example, in some embodiments a Proximity rule can be defined that establishes that an attacker is capable of interacting with an insecure Bluetooth Low Energy (BLE)-capable device over the BLE channel due to the range of BLE, despite being unable to enter a location of the insecure device.

To assess different scenarios it is valuable to consider the level of risk posed by attackers for individual devices to narrow down a number of possible attack paths within the environment of each use case. For example, some scenarios may only consider attackers with access to public locations while others may consider the insider attacks, where the attacker has access to any area. In some embodiments in accordance with the present principles, a model defines an attacker as an independent entity, identical to other entities. For example, an attacker with the "attackCapability" of weak authentication and public access can compromise anything that is accessible from public areas that has weak authentication.

Modeling the physical world and physical interactions between devices in at least some embodiments also accounts for time. Time can be defined as a state in which volatile associations of atoms are stored. This enables a model to capture passage of time as a sequence of actions that transition a network of things from state S to S'. For example, a state can be used to describe whether a device is ON or OFF. It follows that a Switch action is a function that changes the PowerState of a device from S to S', a Move is a function that changes the location of a Device from A to B, between two states, and so on.

FIG. 1 depicts a high level structural diagram of a system 100 for modeling an IoT network(s) and determining potential attack paths (e.g., unexpected/uncharacteristic communication channels, weaknesses, risks of unintended control) for at least one of the IoT network(s) and/or IoT devices of the IoT network(s) in accordance with an embodiment of the present principles. The system 100 of FIG. 1 illustratively comprises a system controller 110 for receiving operating characteristics of IoT devices of a network. In the illustrative embodiment of FIG. 1, the operating characteristics of IoT devices received by the system controller includes information of IoT devices in a network received from a plurality of sniffers 120 and information regarding security policies 140 of the IoT devices, which can be received from a user or via a search of the Internet, which will be described in further detail below. The illustrative embodiment of FIG. 1 further includes an IoT network model 130.

In some embodiments in accordance with the present principles, the system controller 110 uses the operating characteristics of the IoT devices in a network to determine a representation/map of a physical environment of the network and expected physical and cyber interactions between the devices of the network. In the illustrative embodiment of FIG. 1, the system controller receives information (data) regarding at least part of the operating characteristics of the IoT devices from a plurality of sniffers 120. In addition or alternatively, in other embodiments, the system controller can receive information (data) regarding at least part of the operating characteristics of the IoT devices by a user manually inputting such information using a user interface (described in greater detail below) or by searching for such information over the Internet.

Figure 2:
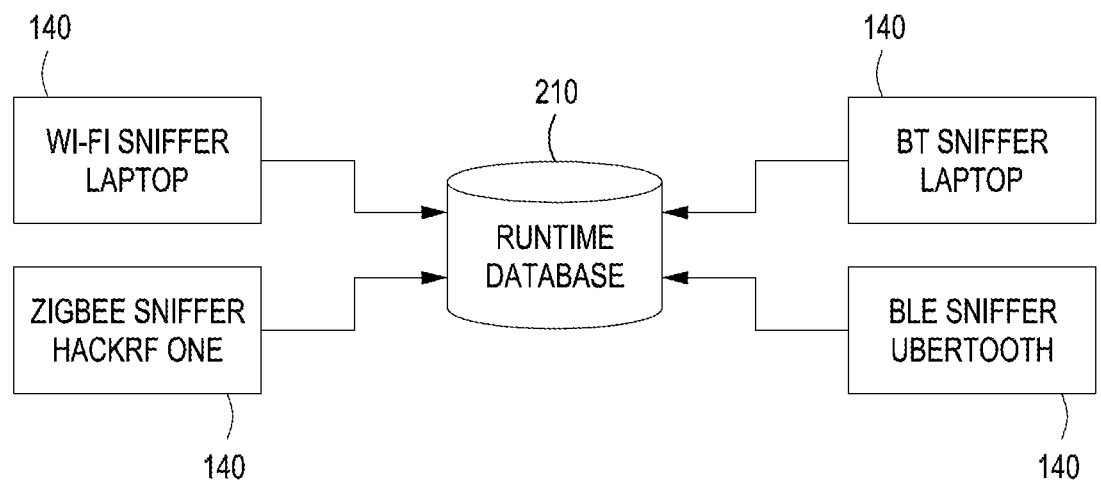
FIG. 2 depicts a high level structural diagram of a configuration of the plurality of sniffers of FIG. 1 in accordance with an embodiment of the present principles.

FIG. 2 depicts a high level structural diagram of a configuration of the plurality of sniffers 120 of FIG. 1 in accordance with an embodiment of the present principles. In the embodiment of FIG. 2, four types of sniffers are implemented: Bluetooth (BT) sniffers, Bluetooth low energy (BLE) sniffers, Wi-Fi sniffers, and ZigBee sniffers. Device information for IoT devices of an IoT network(s) is captured and identified by the sniffers 120 and stored in a database 210. That is, in the embodiment of FIG. 1, the sniffers 120 are used to identify devices that run standardized protocols like Wi-Fi, Bluetooth, ZigBee, etc. Device information regarding operating characteristics, such as heuristics (e.g., MAC address, Bluetooth identifiers, etc.), can be relied on to identify IoT devices.

In an experimental embodiment, the following sniffers were implemented for capturing information regarding operating characteristics of IoT devices in an IoT network(s):

(1) BT and BLE Sniffers.

Ubertooth, an open source Bluetooth monitoring and development platform, and the Bluetooth Linux library BlueZ were implemented to scan advertisement packets from nearby devices. A self-modified version of BlueZ was then implemented to automatically go through the list of detected MAC addresses and retrieve the primary characteristics.

(2) Wi-Fi Sniffers.

Laptops were implemented as Wi-Fi sniffers and a Python program was developed using a Python wrapper for Wireshark to detect nearby Wi-Fi connections pairs.

(3) ZigBee Sniffers.

The HackRF One, a software-defined radio, was implemented to build a ZigBee sniffer. A IEEE 802.15.4 transceiver was created, revised from an existing library 10 in GNU Radio. The output from the IEEE 802.15.4 transceiver in GNU Radio is a data stream that outputs the captured raw packets (the packets that contain IEEE 802.15.4 headers). A Python program was developed to receive the packet stream, extract device information (PAN ID, source, and destination IDs) and push the processed data to a database (e.g., database 210).

The processed device information (i.e., device operating characteristics) can be stored in a database 210 that provides a centralized place for the system controller 110 to read the runtime data and generate a representation/map of the physical environment and the expected physical and cyber interactions between the devices of a network, such as an IoT network. In some embodiments, the generated representation/map of the physical environment and the expected physical and cyber interactions between the devices of the network can comprise a topological representation of an IoT network. In some embodiments, the generated representation/map of the physical environment can comprise a compilation of information related to the physical environment and the expected physical and cyber interactions between the devices of the network, from which an IoT network model can be generated in accordance with the present principles.

The system controller 110 can then analyze the generated representation/map of the network to determine potential attack paths such as unexpected/uncharacteristic physical or cyber interaction paths between the devices of the network over which physical or cyber interactions can potentially occur. That is, the system controller 110 determines physical or cyber interaction paths between the devices of the network that are not expected to exist based on the operating characteristics of the IoT devices. Such determined unexpected/uncharacteristic physical or cyber interaction paths between the devices of the network over which physical or cyber interactions can potentially occur can exist because of physical or cyber properties of IoT devices in an IoT network such as a location of the IoT devices (i.e., IoT devices having Bluetooth capabilities but not expected to communicate are too close and an unintended communication path exists). Other unforeseen physical or cyber properties of the IoT devices in the IoT network can also be a source of unexpected/uncharacteristic physical or cyber interaction paths between the devices of the network over which physical or cyber interactions can potentially occur.

In some embodiments, a Sentient Hyper-Optimised Data Access (Shodan) search engine is implemented to gather information about internet-connected devices and systems and to generate an IoT network model from a remote location in accordance with the present principles.

In such embodiments, a device can be defined as a set of sensors S, actuators A, physical side channels, and metadata. The meta-data about the actual device types is used to identify a set of sensors and actuators for a device. In some embodiments in accordance with the present principles, machine learning techniques are used to predict a product type from a Shodan description. A cross-product S×A of these sets per device can be used to create a vector of probabilities given the specific (sensor$_i$, actuator$_j$) pair. Some pairs will be completely unable to communicate, such as those at coordinates too far for the assumed channel and those in which no information can pass (i.e., audio→visual). The initial vector setting can then be verified by the use of probing signals. That is, an initial goal is to determine initial probability estimates based on static device capabilities and then to refine the estimates based on probing of the network properties.

For example, to verify that the prediction capability of a defined device is sound, the Shodan search engine is seeded with pairs of known devices whose location and physical properties are known and the physical connections of the known devices can be varied. A link between sending traffic to device$_1$ and/or device$_2$ and an effect on the output of the physical change on other device is determined.

In accordance with the Shodan technique described above, a physical path chain can include a channel consisting of a number of virtual and physical hops, induced by write operations to physical properties of the devices and their environment. The sensor and actuator sets of physically close pairs of devices, are matched to establish physical channel pairs.

In some embodiments, unexpected/uncharacteristic physical or cyber interaction paths between the devices of the network are caused by interactions between the Internet devices of the network that are outside of a security policy. That is, in some embodiments, security policies are included in the operating characteristics of an IoT device and if a communication outside of the security policy is identified, that communication is considered an attack path or vulnerability of the IoT network.

Using the information related to the generated representation/map of the network, including the operating characteristics of the IoT devices of the IoT network, the system controller 110 can then create an IoT network model, including information regarding potential hidden communication paths and attack paths. Having such a structure, the system 100 can easily be scaled up when more sniffers are required because of the existence of more or different classes of devices in the network.

Device information for IoT devices of an IoT network(s) captured and identified by the sniffers 120, information regarding the representation/map of the IoT network and information regarding the determined IoT network model can be at least partially stored in the database 210. In some embodiments in accordance with the present principles, the database 210 can comprise a storage means, such as a memory device (not shown), in the system controller 110 of FIG. 1.

In one operational embodiment, Alloy 4.2 was used to determine an IoT model and SAT4J was implemented as an SAT solver. The implemented sniffers created simple signatures based on detected devices, which can take the following form:

```
one sig PhillipsTV_1 extends PhillipsTV { }
{ LivingRoom -> this in ord/ first . position }
one sig AmazonEcho_1 extends AmazonEcho { }
{ LivingRoom -> this in ord/ first . position }.
```

Figure 3A:
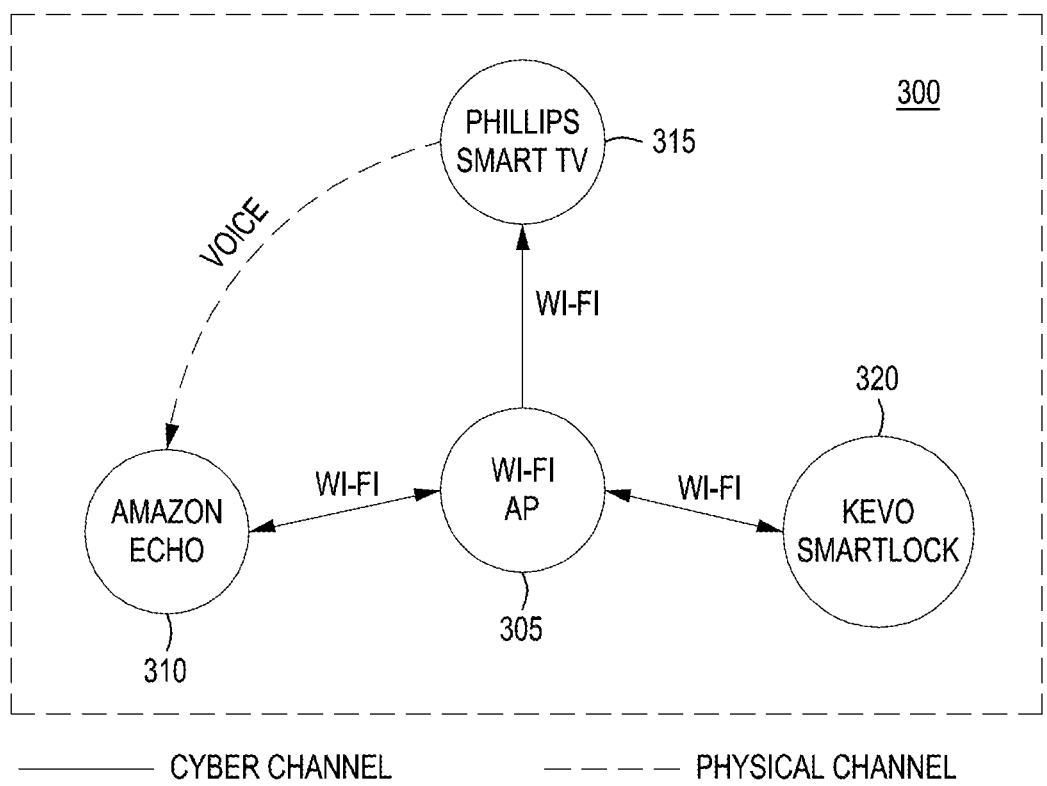
FIG. 3A depicts a topological map of an operational embodiment of an IoT network in which an embodiment of the present principles has been applied to identify a potential attack path in accordance with the present principles.

FIG. 3a depicts a topological representation/map of an operational embodiment of an IoT network in which an embodiment of the present principles has been applied to identify a potential attack path in accordance with the present principles. The exemplary topological map/representation 300 of FIG. 3a illustratively comprises an Amazon Echo 310, a Phillips TV 315, and a Kevo Smartlock 320, all connected to a Wi-Fi network 305. In FIG. 3a, circles represent IoT instances of IoT devices, the solid lines represent the cyber channels, and the dashed line represents an identified hidden channel. In determining a model of an IoT network, a system in accordance with the present principles, such as the system 100 of FIG. 1, defines and determines every implicit connection and dependency based on the facts provided as input to the system. The system does not assume that a communication link is possible only because an edge was explicitly added. In accordance with the present principles, if a device receives input from a given channel, the device can potentially receive communication from any device producing an output in that channel.

As depicted in FIG. 3a, a model analysis in accordance with the present principles performed by, for example, the system controller 110 of FIG. 1, determines from the topological representation/map a potential attack path over a hidden, physical channel between the Phillips Smart TV and the Amazon Echo device. That is, the model analysis identifies an unexpected potential attack path that takes advantage of a potential unexpected communication occurring between the Phillips TV and the Amazon Echo over the unprotected voice channel. The model analysis identifies that the Phillips TV can provide an output to the voice channel, while the Amazon Echo receives as an input the voice output from the Phillips TV without any authentication between the entities.

Figure 3B:
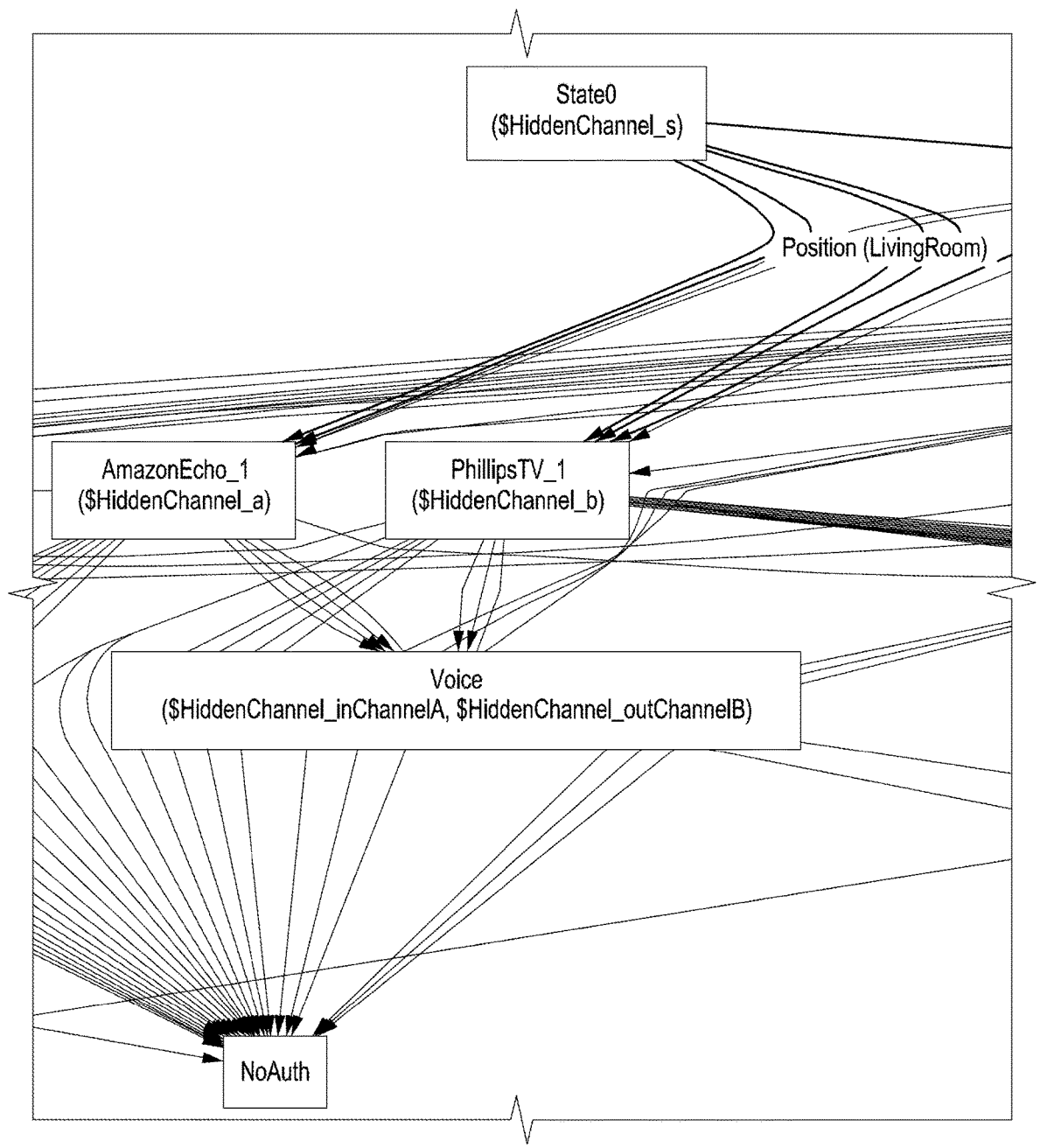
FIG. 3B depicts a visual example of an IoT network model for the IoT network 300 of FIG. 3 in accordance with an embodiment of the present principles

FIG. 3b depicts a visual example of an IoT network model for the IoT network 300 of FIG. 3a in accordance with an embodiment of the present principles. As depicted in FIG. 3b, similar to FIG. 3a, a potential attack path is illustrated at State0 in which the IoT devices associated with the potential attack path are the Phillips TV and the Amazon Echo device, wherein a potential attack path is provided by a Voice channel between the Phillips TV and the Amazon Echo device identified by the IoT network model.

In some embodiments, the feasibility of this attack is left to the user/administrator to verify or mitigate. Typically, a purpose of a model in accordance with the present principles is to identify attack paths (i.e., unexpected/uncharacteristic communication paths) in IoT networks and, as such, expose potential hazards. As described above, in some embodiments in accordance with the present principles, this is accomplished using an analyzer for software modeling and for describing complex structures, such as Alloy or Prolog, which model various systems and identify all potential interactions between devices based on their capabilities.

Figure 4:
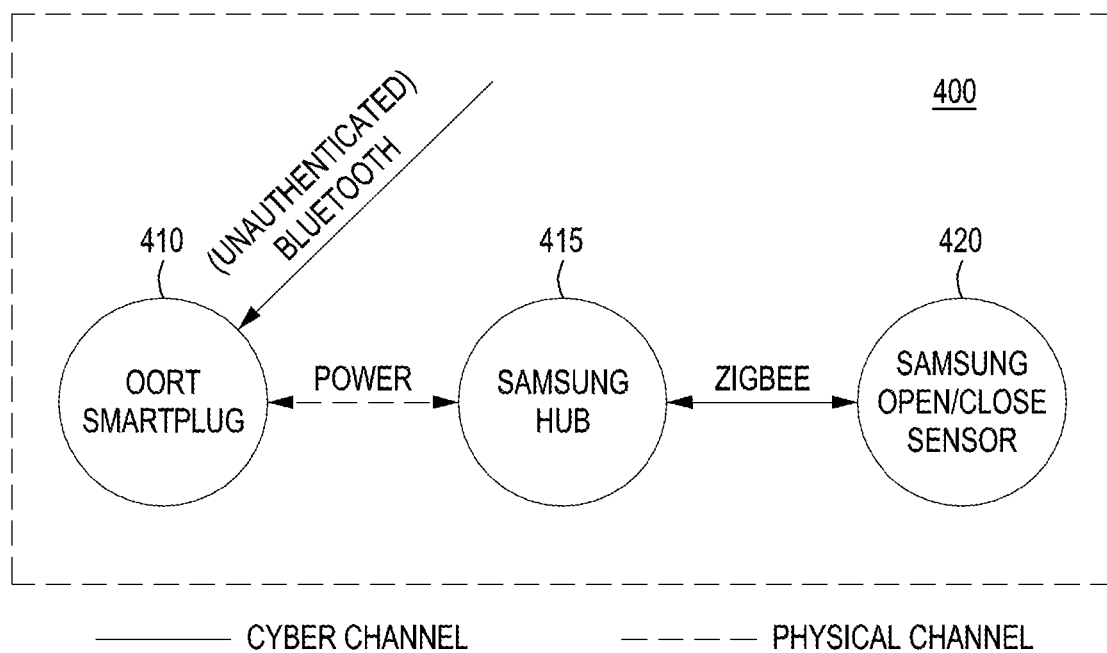
FIG. 4 depicts a topological map of another operational embodiment of an IoT network in which an embodiment of the present principles has been applied to identify a potential attack path in accordance with an embodiment of the present principles.

FIG. 4 depicts a topological map/representation of another operational embodiment of an IoT network 400 in which an embodiment of the present principles has been applied to identify a potential attack path in accordance with an embodiment of the present principles by disproving or providing counter examples to a security assertion of the IoT network 400. The exemplary IoT network 400 of FIG. 4 illustratively comprises an OORT smartplug 410, a Samsung hub 415, and a Samsung open/close sensor 420. In FIG. 4, circles represent IoT instances of IoT devices, the solid lines represent the cyber channels, and the dashed line represents an identified hidden channel. In the IoT network 400 of FIG. 4, the Samsung Open/Close sensor 420 can be installed on a window and trigger user alerts when the window is opened. In the IoT network 400 of FIG. 4, the Samsung open/close sensor 420 and the Samsung hub 415 communicate over a connection protected by AES-128 bit encryption. The OORT smartplug 410 is connected to a multi-extension cord that, with other devices, connects to the Samsung hub 415. The smartplug 410 is equipped with a BLE interface that users can leverage to control the smartplug 410, such as switch it on/off and extract historical logs regarding power consumption. In the IoT network 400 of FIG. 4, the smartplug 410 does not require Authentication to be accessed over BLE. The IoT network 400 of FIG. 4 includes a security assertion that includes that inputs are only able to be received through authenticated channels.

As depicted in FIG. 4, the model analysis identifies from the topological representation/map the potential hazards of the unauthenticated Bluetooth channel. That is, because the OORT Smartplug 410 in FIG. 4 has an unauthenticated Bluetooth channel, anyone can connect to the Bluetooth, which introduces an attack path that compromises other devices that support stronger authentication. That is, by adding a security assertion to the model constraints, that includes that inputs are only able to be received through authenticated channels, a system in accordance with the present principles, such as the system 100 of FIG. 1, is able to identify any violations of the security assertion and specifically identify any unauthenticated channels (i.e., unexpected/uncharacteristic communication paths) as potential attack paths. Without such identification of potential attack paths in accordance with the present principles, any device accepting input over unauthenticated channels but whose output is communicated over authenticated channels can be fooled to misuse the devices' authority. If this property holds, a system identifies no security degradation even though a potential attack path exists. That is, as depicted in FIG. 4, the smartplug 410 can affect the Samsung hub 415 via the power (physical) channel. For example, because the BLE channel to the smartplug 410 is unauthenticated, an attacker could use spoofing commands to turn off the Samsung hub 415, consequently making the window sensor useless. Advantageously, a system in accordance with the present principles identifies the security degradation violation. The example of FIG. 4 exemplifies a principle of embodiments of the present principle which includes that using a topological map/representation of an IoT network and devices and analyzing the map against security assertions of at least one of the IoT devices or the IoT network, itself, enables the identification of potential attack paths (i.e., unexpected communication channels) in an IoT network. That is, an IoT network model in accordance with the present principles, can take into account security assertions when determining potential attack paths (i.e., weaknesses).

Although the previous operational embodiments were described with respect to an IoT network having static operating parameters, by modeling transitions and states, a system in accordance with the present principles, such as the system 100 of FIG. 1, can identify potential attack paths in IoT networks having dynamic parameters that can change over time.

Figures 5, 6:
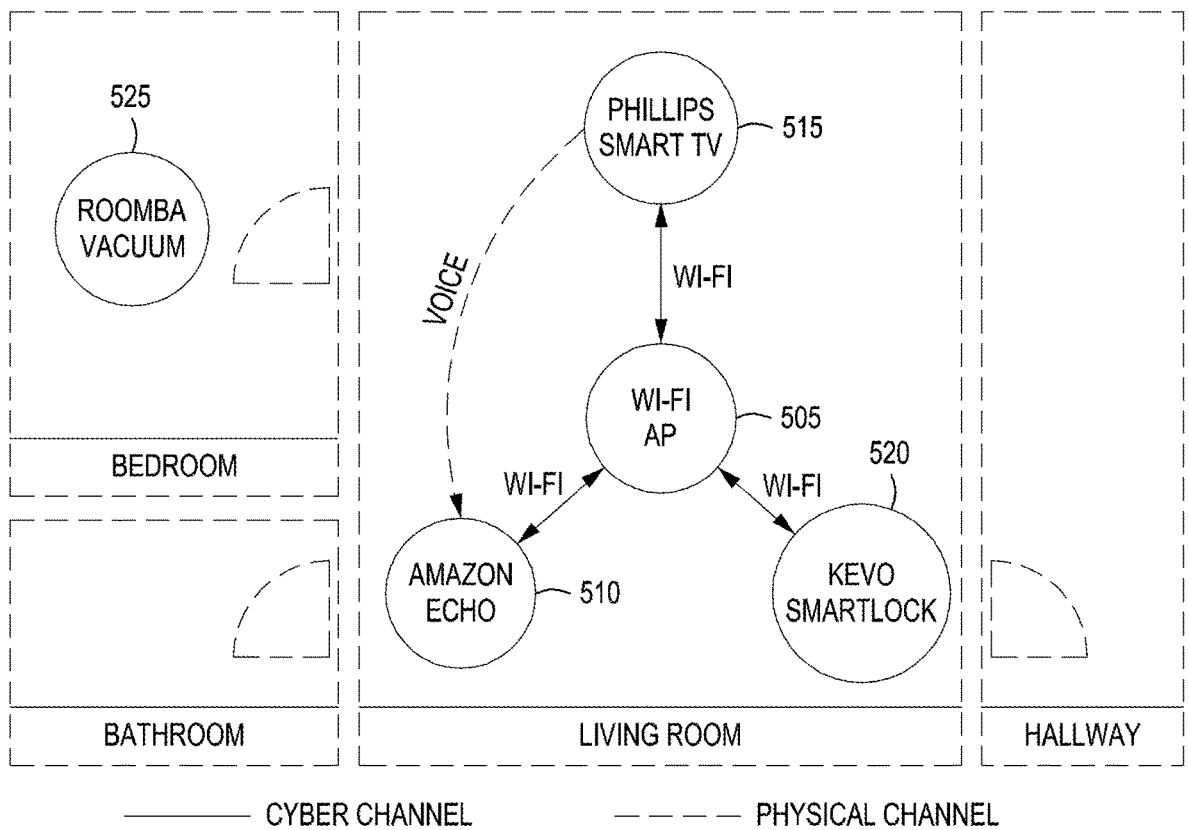
FIG. 5 depicts a topological map of another operational embodiment of an IoT network having at least one dynamic operating parameter in which an embodiment of the present principles has been applied to identify a potential attack path in accordance with the present principles.
FIG. 6 depicts a Table of sequence steps implemented by a system controller to disprove an inputted security assertion in accordance with an embodiment of the present principles.

For example, FIG. 5 depicts another operational embodiment of a topological map of an IoT network 500 having at least one dynamic operating parameter and a security assertion, in which an embodiment of the present principles has been applied to identify a potential attack path in accordance with an embodiment of the present principles. The exemplary IoT network 500 of FIG. 5 illustratively comprises five (5) rooms of, for example, a home. FIG. 5 comprises a bedroom, a bathroom and a living room as private locations and a hallway as a public location. The living room of the IoT network 500 illustratively comprises an Amazon Echo 510, a Phillips TV 515, and a Kevo Smartlock 520, all connected to a Wi-Fi network 505. In FIG. 5, the bedroom has within a Roomba vacuum 525 which can move. The hallway, while physically adjacent and accessible to the private spaces, is isolated by Smartlock 520 that can (like the OORT smartplug) be compromised over the BLE channel.

In an initial state the Roomba vacuum 525 is located in the bedroom, a private location. In the embodiment of FIG. 5, as input to the system controller 110, a security assertion states that "Roomba can never be in a public access area, at any time". The system controller 110, via the use of an IoT network model in accordance with the present principles, attempts to verify the assertion or disprove the assertion by determining a counter-example to identify a security failure.

FIG. 6 depicts a table (Table 1) of sequence steps implemented by a system controller to disprove an inputted security assertion in accordance with an embodiment of the present principles. As depicted in Table 1, in an initial State, S0, the Roomba vacuum 525 is located in the bedroom, a private location. In a second State, S1, the Roomba vacuum 525 moves to the living room. In a third state, S2, the Smartlock 520 is unlocked. In a fourth State, S3, the Roomba vacuum 525 moves to the hallway. As depicted in Table 1, the security assertion fails and a counter-example is found in as few as four states. In embodiments in accordance with the present principles, to have a detailed history of the steps required to determine a failure, every transition between each consecutive state is recorded. For example, in a first recorded state between S and S', Roomba can move from the bedroom to the living room, or an attacker can switch a lock on or off, but both cannot occur simultaneously in the model. It should be noted that in other embodiments, the order of the solutions provided in Table 1 can differ between runs of the model formation by the system controller 110. Additionally, the solutions depend on a number of states that are required. For example, if a higher number of states is requested as a mandatory solution prerequisite, the solution will include a higher number of steps. Such solutions can also have transitions that cancel each other, such as repeatedly moving the Roomba vacuum 525 between the living room and the bedroom.

In some embodiments in accordance with the present principles, the IoT network model determined from the generated representation/map of the network, including the operating characteristics of the IoT devices of the IoT network, can be considered an expected IoT network model. That is, in some embodiments in accordance with the present principles, the physical environment and actual interactions between the IoT devices of the IoT network are monitored to determine an IoT network model based on actual physical and cyber interactions between the Internet devices of the network. An updated or new IoT network model can then be generated including unexpected/uncharacteristic physical or cyber interaction paths between the IoT devices of the IoT network over which physical or cyber interactions can potentially occur, determined using the monitored actual interactions between the IoT devices of the IoT network. In some embodiments, an actual interaction can be defined as and include any interactions that have occurred or are occurring with the IoT devices in the IoT network and external or third party devices.

In embodiments of IoT networks and/or IoT network devices which include at least one dynamic property, an IoT network model in accordance with the present principles can be generated more than once to capture the dynamic properties of such embodiments. For example, some IoT networks include IoT network devices with dynamic operating characteristics such as changing power levels, changing communication parameters changing authentication, changing location, date, time, and voice (i.e., hardware mute— once you mute, you don't have a channel) just to name a few. When such dynamic devices or network conditions exist, an IoT network model can be re-generated to capture the changes of the devices or network conditions in a current IoT network model. In some embodiments, network conditions and/or device operating characteristics are monitored on at least a periodic basis, and when a network condition and/or device operating characteristic is detected to have changed, the IoT network model is re-generated to capture the current network conditions in a current model. For example, in some embodiments, a sniffer can alert a system controller of the present principles, such as system controller 110 of FIG. 1, that an operating characteristic of a network device has changes, and in response, the system controller can cause a generated IoT network model to be re-generated. In some embodiments, network conditions and/or device operating characteristics are not monitored and the IoT network model can be automatically re-generated on at least a periodic basis.

As described above, the security and privacy properties, as well as other operating characteristics of the IoT devices, can be used to generate a model of an IoT network that includes security and privacy profiles. In some embodiments, the security and privacy properties of common IoT devices can be catalogued in a database of a system, such as the system 100 of FIG. 1, to be considered when generating an IoT network model in accordance with the present principles. In addition or alternatively, in some embodiments, security and privacy profiles of IoT devices can be input to a system of the present principles by a user or such security and privacy profiles can be determined by information obtained from the Internet.

In some embodiments, a determined IoT network model in accordance with the present principles can be used to perform a differential assessment of two IoT networks. Specifically, the modeling can be used in identifying how the addition (or removal) of an IoT device into an existing network impacts the interactions between devices and, consequently, the set of possible attack paths. When a new IoT device is to be added to the IoT network, security and privacy properties, and other operating characteristics, of the IoT device to be added are communicated to a system controller of a system in accordance with the present principles, such as the system controller 110 of the system 100 depicted in FIG. 1. Using the security and privacy properties, and other operating characteristics, of the IoT device to be added to a network, simulations of devices and configurations are applied to an IoT network model of the existing IoT network to predict the impact of adding the new IoT device to the network at least on vulnerability and security of at least one of the network and/or the IoT devices of the network (described in greater detail below with regards to FIG. 10).

In some embodiments in accordance with the present principles, the security and privacy properties, and other operating characteristics, of common IoT devices can be stored in a database accessible by a system controller, such as the system controller 110 of FIG. 1. Alternatively or in addition, in other embodiments, information regarding security and privacy properties, and other operating characteristics of the IoT device can be input to the system controller 110 by a user using a graphical user interface that can be provided to a user on a mobile device or via a web-page by, for example, the system controller 110 (described in greater detail below with regards to FIG. 10).

In embodiments in accordance with the present principles, a relative security characterization (which could be based on a metric expressed as a numeric value), rather than absolute measurements are provided for IoT devices and/or networks. The metrics for providing such security characterization include at least verifiable configuration metrics based on passive and active measurements and verifications of device states and behavior, privacy metrics, and the ability to measure how security mechanisms compose within one device and across devices. In some embodiments, such analysis is performed using Defense Graphs and Trust Distribution Diagrams. The metrics can be combined and interpreted for example using dimensionality reduction and topic modeling techniques to visualize and combine a multitude of metrics into meaningful security and privacy profiles and scores for at least one of an IoT network and/or the IoT devices of the network. Such scores can also be used to determine the impact of adding a new IoT device to an IoT network. For example, a security score can be determined for at least one of the IoT network and/or the IoT devices of the network based on an IoT network model for the IoT devices and the physical environment of an IoT network. When a new IoT device is considered for addition to the IoT network, a new IoT network model is generated as described above for the IoT network including the new device to be added. A security score is determined for at least one of the IoT network and/or the IoT devices of the network based on the new IoT network model including the new device. In some embodiments, the relative security scores for both networks can be presented to a user via, for example, a GUI so that a user can determine the impact of adding the new IoT device to an existing IoT network. In other embodiments, a determination can be made by, for example the system controller 110 of FIG. 1, using the determined security scores related to both IoT network models, whether a device to be added will improve or reduce an overall security score of the IoT network or IoT devices of the network, and a representation (i.e., a numerical representation) of the improvement or reduction of a security score can be presented to a user using, for example, the GUI.

In some embodiments, a measurement of the IoT network's security posture to be used to determine a relative security score for at least one of an IoT network and/or IoT devices of the network can be determined using Defense Graphs (DG), i.e., directed, acyclic graphs, D, representing a system of composed security mechanisms where the vertices are the defense mechanisms or policy selectors, and the edges are data paths between vertices. More specifically, defense Graphs are a formal modeling tool which put the focus on the layout of security mechanisms. DGs make anti-patterns and points of composition apparent in the system, allow for simple analysis of properties of a system, and can be used to re-define intuitions about security, and some known principles. The security mechanisms (vertices) are automata that interpret some input language I and enforces a policy on it, emitting an output language O. It is stated that a mechanism accepts an input i∈I when i∈O. Conversely, a mechanism rejects an input i∈I if i∉O.

Several properties which can be used to reason about Defense Graphs include: (a) coverage, i.e., the type of input instrumented; (b) redundancy, i.e., the proportion of that input instrumented multiple times; (c) independence, i.e., the ability of mechanisms to properly work independently of each other or in composition (i.e., there is a direct data path from one to the other); and finally (4) the cost of the whole configuration (performance, budget, etc.). Two types of composition can arise: deterministic in which the order of operation on data stream is consistent, and non-deterministic. In some embodiments in accordance with the present principles, DG properties (such as its edge/vertices connectivity, clique number, subgraphs, etc.) are implemented to determine measurements of a network's security posture because DG properties can yield interesting metrics to characterize the security and composability of a system.

In some embodiments in accordance with the present principles, Trust Distribution Diagrams (TDDs) are implemented to offer a visual language for understanding the amount and placement of trust relationships in a piece of software. For example, FIG. 7 depicts the trust relationships in 13 real-world pieces of software with respect to TDDs. TDDs provide a means for visualizing trust in software components and offer a complementary alternative to both formal assurance arguments and prose-based assertions of trustworthiness. A collection of Trust Distribution Diagrams enable different comparisons, for example, (1) comparisons of TDDs for distinct software types (comparing the TDDs for multiple mail servers, web servers, etc.); (2) a mapping of historical bugs and vulnerabilities into TDD components for this collection of software; and (3) a display of how a single trust pattern (OpenBSD's privilege separation mechanism) manifests across multiple distinct software systems. These relationships make an informal reasoning about the relative trustworthiness of software systems more explicit and concrete. Based on the comparisons above, three hypotheses can be formulated:

Hypothesis 1: most known vulnerabilities will appear in highly trusted components.

Hypothesis 2: the same TDD pattern will make TDDs for disparate software look similar.

Hypothesis 3: TDDs for different instances of a single software type will look different because of developer design decisions (and possibly underlying technology and infrastructure).

In one embodiment, an approach to drawing TDDs is to examine the source code of each IoT application while documenting the major components, data structures, processes, and communications pathways. The IoT applications become nodes in the TDD. In addition, edges are drawn when an important trust relationship (not just a functional relationship) could be expressed between the devices. In various embodiments this process is an iterative process of finding the "right" level of abstraction.

For measurements related to device configuration, the objective is to determine—with some degree of certainty—to what extent a specific instance of a device has certain properties that may be different from other instances of the same device class. The notion of configuration could range from simple parameter settings to everything happening on a device at any given time, including what software/firmware the device is running and what specific instructions are being executed, and also all details of its hardware. Depending on the extent to which devices in the same class can be individually configured, it may be crucial to security and privacy metrics that the configuration of a given device can be measured. For example, if a class of device ranks highly because of how it was developed and the protective features the device can support, an instance of that device class where those features have been disabled or configured in a weak fashion should not be ranked as highly.

A configuration measurement can be collected in a fashion that provides some protection against a compromised device lying about its configuration. Measurement collections methods vary in their difficulty and in their fidelity, and can include at least the following categories: 1) Passive observation of intended communication; 2) Passive observation of unintended communication; 3) Simple active probing; Advanced active probing; and Attestation.

Passive observation of intended communication is the relatively simple collection of communications received and transmitted by a device, requiring only read access to the communications channel. Observed features such as protocols and ports used and service banner messages and headers can be used to determine device configuration. An example of a method in this category would be to monitor device communication to ensure that it is always encrypted. The analytics applied to the observed features could span a wide range of sophistication, from simple pattern matching to advanced profiling and various machine learning techniques. In one embodiment in accordance with the present principles, for the more advanced profiling, an anomaly detection approach can be implemented. For example, anomaly detection can be used to create device behavior profiles, which mobile ad-hoc network (MANET) nodes used to determine the trustworthiness of other nodes. This can also apply to MANET nodes that would not require authentication mechanisms, which can also be the case for IoT devices with limited capabilities.

In some embodiments, the trustworthiness of IoT devices is measured with respect to the communication profiles of the IoT devices, by analyzing the ingress/egress patterns of the IoT devices. Such a profile-based approach enables devices to compose trustworthy sub-systems. The sub-systems and the formed communication patterns can be analyzed to understand when they become untrustworthy. In some embodiment, for assessing the trustworthiness stability, Clique analysis can be implemented. This approach can expose quantitative metrics such as size and frequency which can be indicative of changes in behavior.

Passive observation of unintended communication is also known as side-channel analysis, and involves the observation of signals that are not intentionally emitted. For example, such unintentional communication can be accomplished via includes electric, RF, thermal, and other unintended emissions that can potentially reveal details about the device configuration. A benefit of monitoring unintended communications is that it can be more difficult for a compromised device to pretend to be uncompromised.

Simple active probing actively communicates with devices in a relatively simple fashion to determine aspects of its configuration. Active probing can include port scanning in an nmap fashion or determine through negotiation which cryptographic methods are supported and which ones are not. Active probing is an efficient way to provide certain measurements and reduce uncertainty, but it is not necessarily resistant to deception from a compromised device. Another way to achieve active probing is by treating the IoT as a data-centric system, for which data models that capture the exchanged data name, data type, and Quality of Service (QoS) can be defined or even inferred. The active probing can be used to verify that devices communicate with each other following a data model and devices adhere to the data model.

Advanced active probing is used to craft advanced probing messages to extract information that the device may not be set up to easily reveal. Advanced active probing includes traditional fuzz testing that tends to have random content and also more advanced forms of probing such as semantic fuzzing, where valid messages are crafted to extract information or manipulate the device in some fashion.

Attestation can be used to verify certain properties of a device using cryptographic methods that ensure authenticity and timeliness in the measurements. For IoT devices, attestation can be hardware-based, a hardware-software hybrid, or entirely software-based. Challenges to implementing remote attestation in IoT devices include the reliance on specialized hardware and/or software in resource-constrained environments, and scaling to large numbers of heterogeneous devices.

In an IoT network with a large number of devices and communications, it can be beneficial to aggregate metrics. For example in an IoT network including smart vehicles, the cumulative entropy can be measured as the sum of entropy that can be gathered on a route through a series of independent mix zones (i.e., areas where several vehicles are close to each other at the same time, such that an adversary cannot distinguish the vehicles as they leave the mix zone in different directions). Most of the aggregative metrics (cumulative entropy, genomic privacy, health privacy, expected estimation error) can be computed as linear combinations of privacy metrics values or geometric means. Typically to best aggregate metrics (that is, of the same nature), arithmetic or geometric means are implemented to provide meaningful privacy interpretations. In some embodiments in accordance with the present principles, to interpret privacy metrics, privacy profiling (containing aggregations and combinations of metrics) is used to characterize the privacy. To complement the tradeoff between privacy and utility, however, a metric that characterizes the adversary capabilities, e.g., in terms of probability of success and cost of an attack (monetary/time/memory) can be implemented. That is, a problem to be solved includes how to resolve the need for usable data processing with a data owner's need to define meaningful privacy policies? That is, it can necessary to balance the utility for the data requester (e.g., in term of accuracy of the analysis to be performed on noisy data) versus the data sensitivity and data protection desired by the data owner. In some embodiments, such a balance can be reached using the probability preservation property of the R'enyi entropy to measure the effect on the success probability of the adversary when imperfect distributions are used.

A robust technique to combine metrics involves monitoring the state of sub-systems of an IoT network (i.e., determining if security degradations happen across the whole sub-system). In particular, the problem of security metrics is considered at the level of a group of IoT devices rather than at the level of an individual IoT device. For that, topic modeling, which is a type of statistical model that provides an efficient framework for performing topic training and inference of mixing proportion of topics, can be implemented. A benefit of topic modeling is that each topic is individually interpretable and characterizes a coherent set of correlated terms. Topic modeling is applied to the metrics vectors of each IoT device in a sub-system, resulting in the construction of topics (i.e., indicators of the state of the sub-system). While actively measuring the progress of a sub-system, a mixture of weights is extracted for different topics, defining the overall state of a sub-system. In some embodiments in accordance with the present principles, the Hierarchical Dirichlet Process (HDP) algorithm is implemented to accomplish the Topic modeling. As suggested by its name, HDP is essentially a hierarchical graphical model, which extends the Latent Dirichlet Allocation (LDA). In general, dimensionality-reducing techniques are used to combine security metrics. Traditional techniques such as Principal Component Analysis and multidimensional scaling are linear techniques that are unadapted to capture similarity or local structure so classical machine learning techniques, such as Sammon mapping [18] or t-distributed stochastic neighbor embedding (t-SNE) are used instead.

Figure 8:
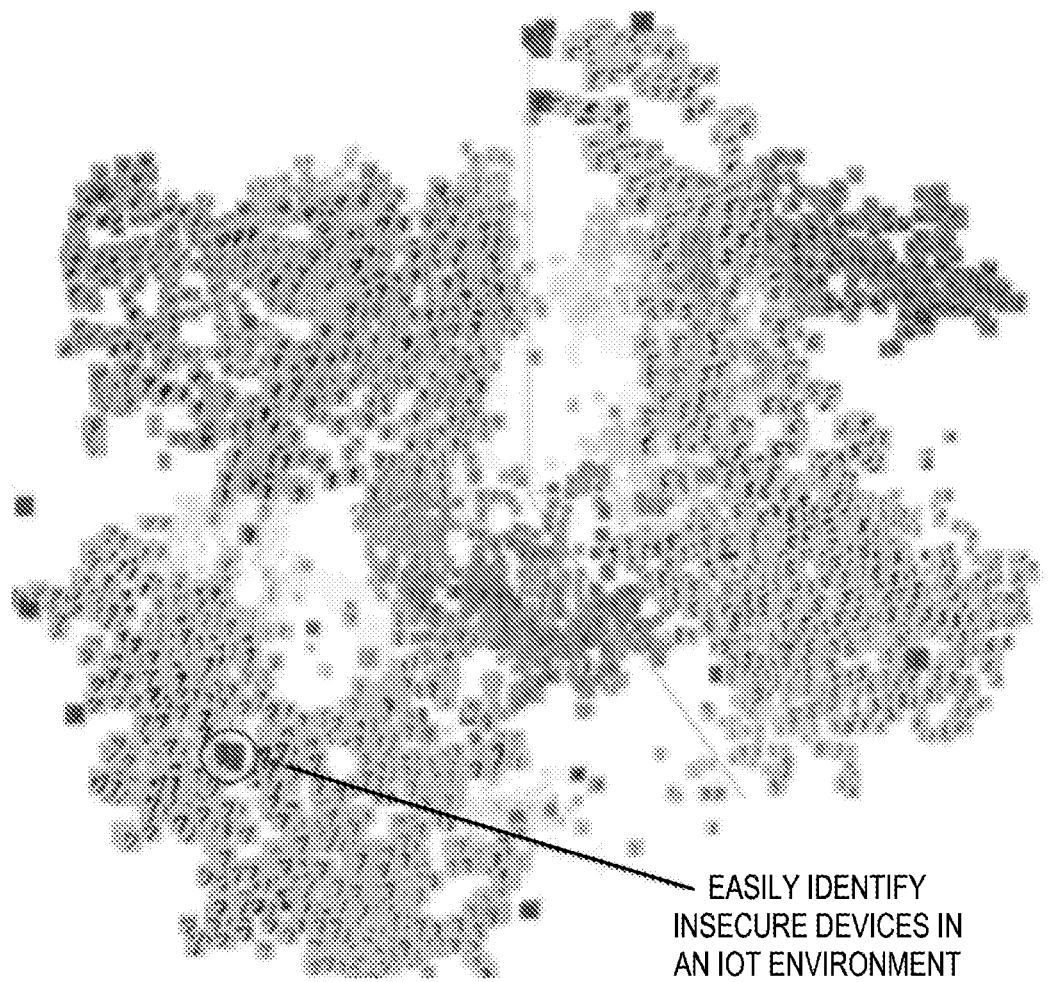
FIG. 8 depicts a TensorFlow representation of an IoT network environment, in which IoT devices are clustered using t-SNE according to some security and privacy metrics in accordance with an embodiment of the present principles.

In embodiments in accordance with the present principles, visual explorations of dimensionality reduction techniques offer privacy guarantees and meaningful interpretation of an IoT network environment. Visualization of dimensionality reduced data has proven to be extremely useful in machine learning and deep learning as a tool to comprehend neural networks. For example, FIG. 8 depicts an example TensorFlow representation of an IoT network environment that can be created, in which IoT devices are clustered using t-SNE according to some security and privacy metric in accordance with an embodiment of the present principles. As depicted in FIG. 8, insecure IoT devices in the network environment are easily identifiable using such grouping techniques.

In accordance with various embodiment of the present principles, properties of an IoT network model can include at least device features and capabilities (i.e., network as well as sensing and actuating), physical location (i.e., public vs. private locations), proximity (i.e., near vs. far, Bluetooth vs. WiFi, voice), mobility, time and states (i.e., time is treated as another dimension "chaining" states together in a sequence), and security properties (i.e., authentication and integrity).

When an attack (e.g., unauthorized/unexpected communication, unintended control of an IoT device) in an IoT network is identified, the potential attack paths identified by an IoT network model in accordance with the present principles can be used as a map to begin searching for a cause of the attack. For example, in some embodiments, side channel information is used to (1) monitor/characterize devices and (2) identify actuating and sensing behavior. More specifically, information regarding cache access, timing details, power footprint, electromagnetic footprint, acoustic properties, and the like of a properly operating device can be compared with similar properties a device in an IoT network that has been identified by an IoT network model as being in a potential attack path to determine if the IoT device is functioning improperly. The identification of an IoT device that is working improperly along with the potential attack paths identified by the IoT network model can provide a strong assumption as to a cause of an identified weakness.

In other embodiments in accordance with the present principles, the side channel information of any IoT device in an IoT network can be monitored/characterized as described above to identify a potential cause of a weakness/attack to the IoT network regardless of whether or not that IoT device identified as operating improperly lies in an identified potential attack path. In some other embodiments, causality can be determined by using historical observations and comparing such observation over time.

In some embodiments, active probing signals can be implemented to validate causality by sending specially crafted probes (network packets or side channel input) to enable the analysis of device responses to the specially crafted probes, both cyber (e.g., network packet response) and physical (e.g., EM radiation) to attempt to identify a cause of a device or network weakness (attack path). That is, variations in device responses provide insight into device ID, capabilities, and configurations and enables a discovery and/or inference of not only if an IoT device is operating correctly but also a reachability of IoT devices beyond their typical intended Internet-connected capabilities.

In some embodiments of an IoT network model in accordance with the present principles, the model considers whether devices external to an IoT network can impact the particular IoT network. That is, using a variety of information sources regarding at least the characteristics of an IoT device located in proximity to an IoT network being modeled, the probability of the existence of a physical channel (i.e., establish the 'next' hop) between IoT devices on the network edge and an IoT device in another network can be assessed. In some embodiments, information sources for an IoT device located in proximity to an IoT network being modeled can include any of the sources described herein for an IoT device in a IoT network being modeled, including but not limited to device characteristics determined by sniffers, device characteristics input by a user and/or device characteristics determined via a side channel(s).

In some embodiments, the likelihood of interactions between IoT devices, both external and internal to an IoT network(s) being modeled, can be assessed by uncooperatively probing the IoT devices and monitoring cyber and physical responses of the IoT devices. Resulting information of such probing can be used to determine a causality lineage across networks. In some embodiments, causality can be determined by using historical observations, which can be compared over time.

Figure 9:
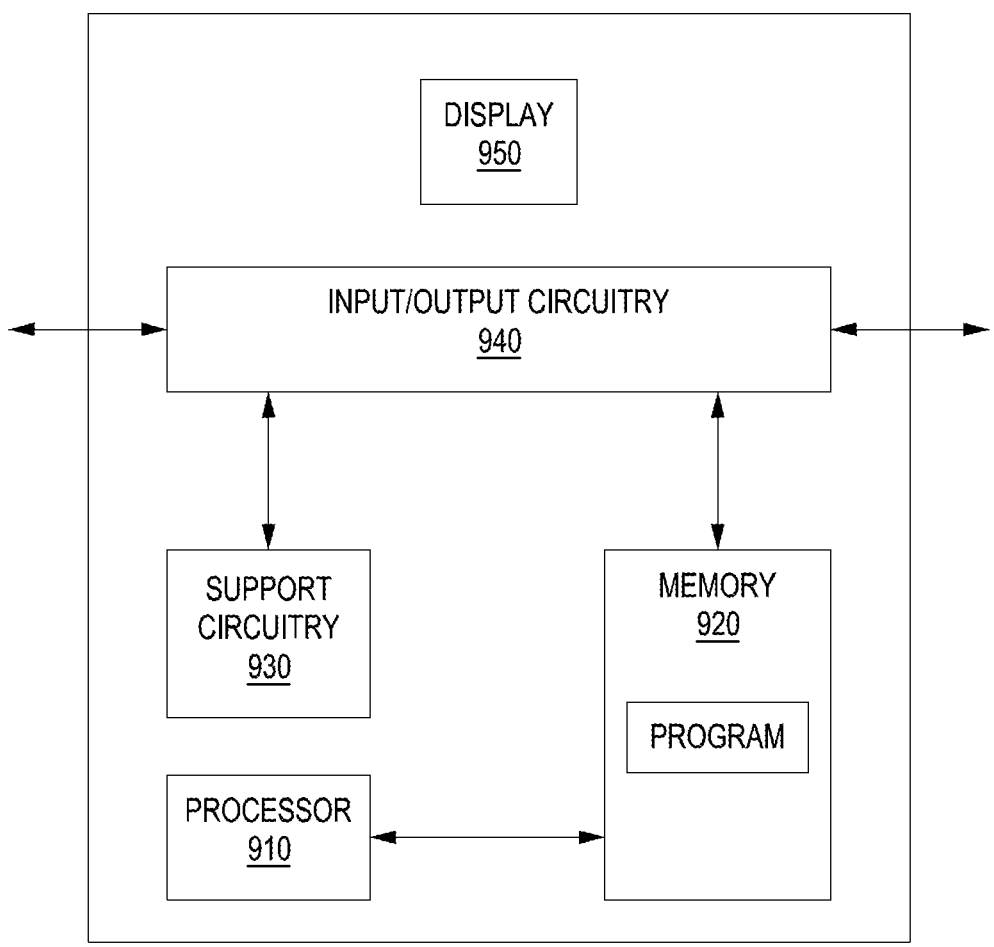
FIG. 9 depicts a high level block diagram of a computing system capable of performing the functions and processes of the system controller 110 of FIG. 1, in accordance with an embodiment of the present principles.

FIG. 9 depicts a high level block diagram of a system controller 110 capable of performing the herein described functions and processes of the present principles in accordance with an embodiment. The system controller 110 of FIG. 9 illustratively comprises a processor 910, which can include one or more central processing units (CPU), as well as a memory 920 for storing control programs, configuration information, backup data and the like. The processor 910 cooperates with support circuitry 930 such as power supplies, clock circuits, cache memory and the like as well as circuits that assist in executing the software routines/programs stored in the memory 920. As such, some of the process steps discussed herein as software processes may be implemented within hardware, for example, as circuitry that cooperates with the processor 910 to perform various steps. The system controller 110 also contains an input-output circuitry and interface 940 that forms an interface between the various functional elements communicating with the computing system 900. For example, in some embodiments the input-output circuitry and interface 940 can include or be connected to an optional display 950, a keyboard and/or other user input (not shown). The input-output circuitry and interface 940 can be implemented as a user interface for interaction with the system controller 110.

The system controller 110 can communicate with other computing devices based on various computer communication protocols such a Wi-Fi, Bluetooth® (and/or other standards for exchanging data over short distances includes protocols using short-wavelength radio transmissions), USB, Ethernet, cellular, an ultrasonic local area communication protocol, etc. The computing system 900 can further include a web browser.

Although the system controller 110 of FIG. 9 is depicted as a general purpose computer, the system controller 110 is programmed to perform various specialized control functions in accordance with the present principles and embodiments can be implemented in hardware, for example, as an application specified integrated circuit (ASIC). As such, the process steps described herein are intended to be broadly interpreted as being equivalently performed by software, hardware, or a combination thereof.

In accordance with embodiments of the present principles, a graphical user interface (GUI) can be provided for providing user inputs to a system controller in accordance with the present principles, such as the system controller 110 of FIG. 1. In some embodiments, the system controller 110 outputs the GUI for presentation using a display of the system controller 110, such as the display 950. In addition or in the alternative, in some embodiments, the system controller 110 can cause the GUI to be displayed on a user display device, such as a computer, mobile communications device (such as mobile phones) and the like, by, in some embodiments, providing the GUI on a web page accessible by users of computers and mobile communications devices and the like or by providing an application, executable by computers and mobile communications devices, in which the GUI is able to be displayed on a display associated with the respective devices via the launching of the application. Inputs to or interactions with the GUI can be implemented using an input device of the system controller 110 and/or input devices of computers and mobile communication devices and the like, implementing the GUI. An embodiment of a GUI in accordance with the present principles is depicted and described in further detail below with respect to FIG. 10A.

Figure 10A:
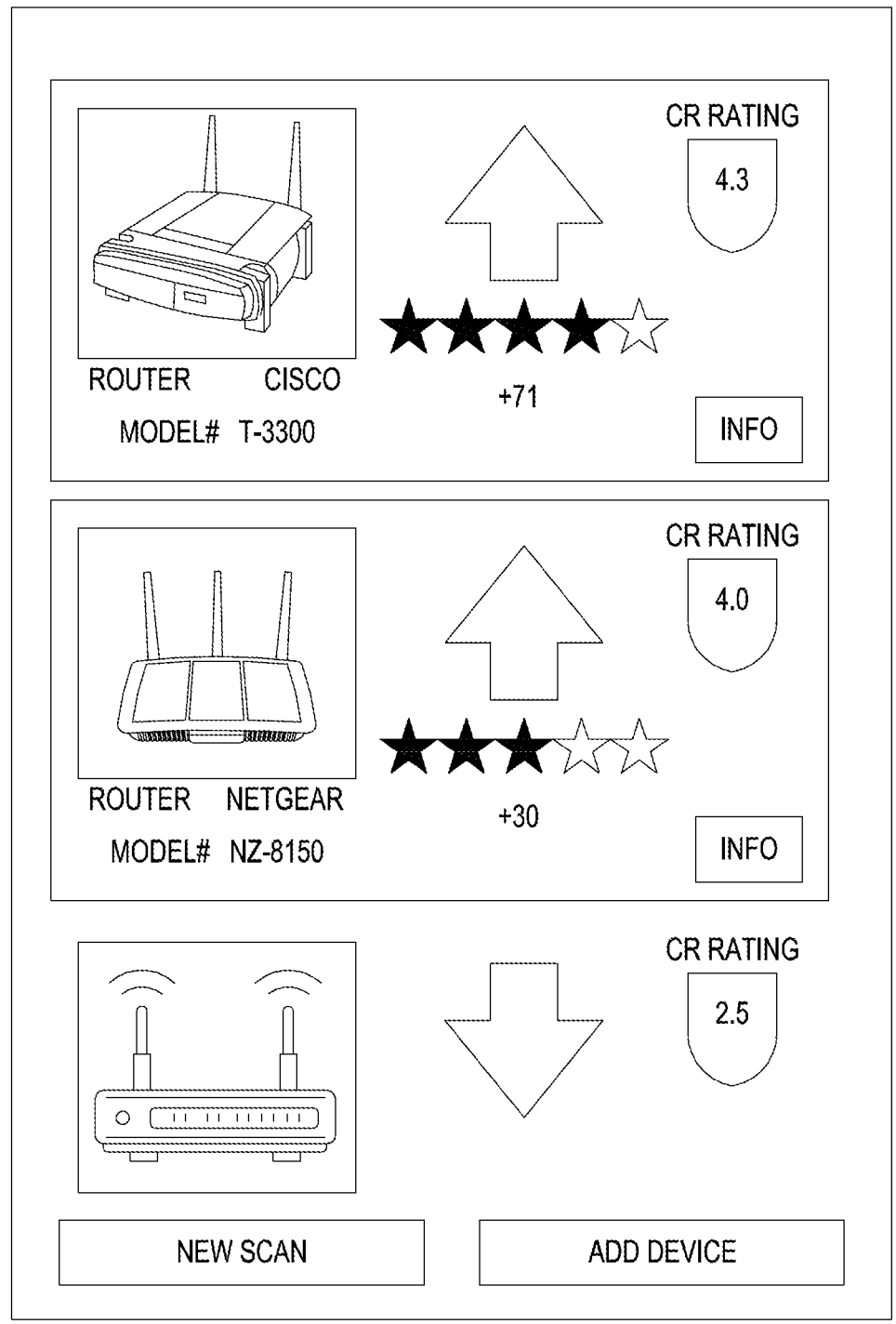
FIG. 10A depicts a graphical representation of an embodiment of a GUI for enabling user input to a system of the present principles and for providing information to a user of the GUI in accordance with an embodiment of the present principles.

For example, FIG. 10A depicts a graphical representation of an embodiment of a GUI for enabling user input to a system of the present principles and for providing information to a user of the GUI in accordance with an embodiment of the present principles. As depicted in FIG. 10A, a GUI provides a means for presenting information, such as security scores, to a user and for receiving from a user information, such as information related to operating characteristics of IoT devices of a network.

As described above, inputs can be provided via the GUI using an input device of the system controller 110 of FIG. 1, or via inputs associated with a computer or mobile communication device and the like presenting the GUI to a user. As depicted in FIG. 10A, a user can use the GUI to identify an IoT device to be considered for addition to an IoT network for which an IoT model in accordance with the present principles has been determined. In response, a system controller, such as system controller 110, determines an IoT network model, as described herein, using the operating characteristics of the device to be added and returns a relative security score or a depiction of how an existing security score for an IoT device(s) or the entire IoT network will improve or worsen to a user using the GUI.

In some embodiments, a meta-analysis can be performed by a system controller in accordance with the present principles, such as the system controller 110 of FIG. 1 that discovers an effect on multiple network properties by the addition or removal of an IoT device of a subject IoT network(s). In an operational embodiment, Prolog was used to perform the analysis and discover an effect on multiple network properties by the addition or removal of an IoT device in a subject IoT network(s).

In some embodiments, the operating characteristics of common IoT devices can be stored in a database accessible by a system controller or a user can enter such operating characteristics, in one embodiment, in response to a request for such information provided by the system controller using the GUI. In some embodiments, an application provided to a user device or via the GUI can enable a user to scan, for example, a barcode or other information label containing information regarding the operating characteristics of a device to be added to an existing network, to provide such information to a system controller in accordance with the present principles.

Figure 10B:
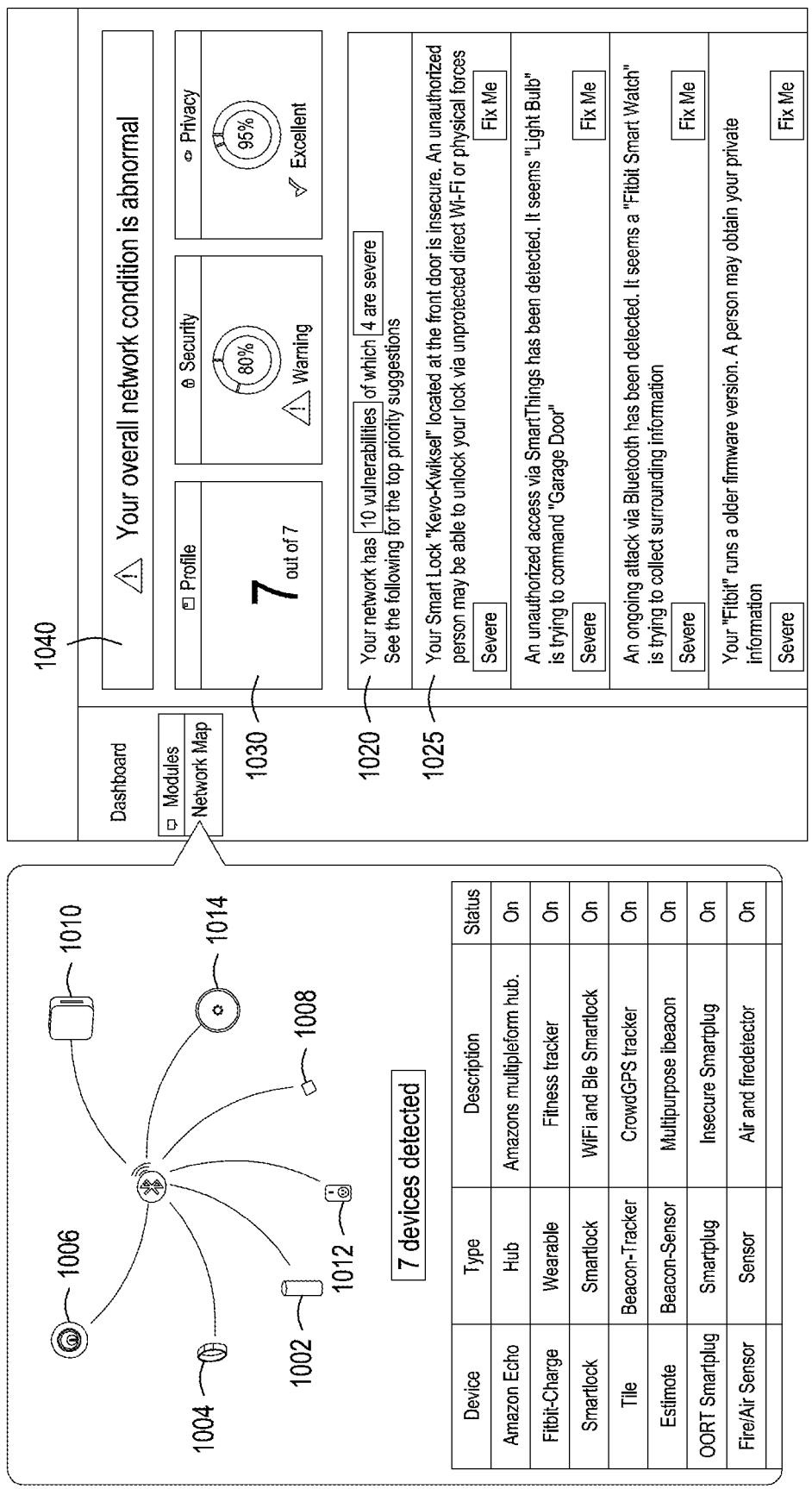
FIG. 10B depicts a graphical representation of an embodiment of a GUI in which the GUI is used as a dashboard for reporting characteristics and security and privacy scores/postures of at least one of IoT devices and an IoT network in accordance with an embodiment of the present principles.

FIG. 10B depicts a graphical representation of an embodiment of a GUI in which the GUI is used as a dashboard 1000 for reporting characteristics and security and privacy scores/ postures of at least one of IoT devices and an IoT network in accordance with the present principles. That is, information contained in an IoT model in accordance with the present principles, can be used to create a dashboard 1000 to be presented to a user which, as depicted in FIG. 10B, can be implemented to report to a user operating statuses of the IoT devices of an IoT network and determined security and privacy postures. In the embodiment of FIG. 10B, the dashboard 1000 indicates that seven (7) IoT devices were found in a subject IoT network(s) and the discovery of the IoT devices is exemplary reported in the dashboard 1000 of FIG. 10B under a section entitled "Profile". As described above, in some embodiments, the seven (7) IoT devices can be discovered using sniffers. In the embodiment depicted in FIG. 10B, the seven (7) identified IoT devices include an Amazon Echo 10002, a Fitbit-Charge 1004, a Kevo Smart-Lock 1006, a Tile GPS tracker 1008, an Estimote beacon sensor 1010, an OORT Smartplug 1012, and a Fire/Air sensor 1014. As depicted in FIG. 10B, in some embodiments in accordance with the present principles, the dashboard 1000 can also include a listing of the type of IoT device(s), a description of the IoT device(s) and a status of the IoT device(s) (i.e., whether the IoT device is "on" or "off").

In the embodiment of FIG. 10B, an IoT model of the present principles has identified ten (10) weaknesses (e.g., unexpected communication channels, weaknesses, risks of unintended control, etc.) in at least one of the IoT devices of the subject IoT network and/or in the subject IoT network(s) itself, using the methods described herein with respect to IoT network models. In the embodiment of FIG. 10B, such information is reported to a user in a middle section 1020 of the dashboard 1000. In the exemplary embodiment of FIG. 10B, the dashboard 1000 can also be used to report to a user a cause of the identified weaknesses. In the embodiment of FIG. 10B, the dashboard 1000 reports that four (4) servers are a cause of at least some of the identified weaknesses.

In some embodiments in accordance with the present principles a dashboard 1000 can further be implemented to describe the details of the identified weaknesses. For example, in the embodiment of FIG. 10B, in a lower section 1025 under the middle section 1020, the details of the identified weaknesses are presented to a user. For example, in the embodiment of FIG. 10B, the dashboard 1000 is used to report that the Kevo Smartlock 1006 located at a front door is insecure because an unauthorized unlocking of the Smartlock 1006n can occur over unprotected direct WiFi or by using physical force. In the embodiment of FIG. 10B, the dashboard 1000 further reports that the Fitbit Smart Watch 1004 is attempting to collect surrounding information via Bluetooth. In the embodiment of FIG. 10B, the dashboard 1000 further identifies that a device is attempted to be used for an unintended purpose and that one of the IoT devices is running an old version of firmware.

In the embodiment of the dashboard 1000 of FIG. 10B, an upper section 1030 is implemented to report a status of the IoT devices and the IoT network(s). For example, in FIG. 10B under a section entitled "Profile" in the upper section of the dashboard 1000, it is reported that the operating characteristics of all seven (7) devices discovered are identifiable. In the upper section of the dashboard 1000 in a section entitled "Security", a relative security metric/score for at least one IoT device of the IoT network and/or for the entire network. In one embodiment, the relative security score is reflective of a comparison of a security posture of the subject IoT network versus, for example, an IoT network that has no weaknesses. A relative security score to be displayed in the dashboard 1000 can be determined as described above.

In the upper section 1030 of the dashboard 1000 in a section entitled "Privacy", a relative privacy metric/score for at least one IoT device of the IoT network and/or for the entire network. In one embodiment, the relative privacy score is reflective of a comparison of a privacy posture of the subject IoT network versus, for example, an IoT network that has no privacy concerns. A relative privacy score to be displayed in the dashboard 1000 can be determined as described above.

In some embodiments, a dashboard in accordance with the present principles, can implement color to indicate a status level of the fields of the dashboard. For example, in FIG. 10B a top-most field 1040 displays in yellow an indicator that the overall condition of the subject network is abnormal. In the top section 1030 in the embodiment of FIG. 10B in the section entitled "Security", the security score is displayed in yellow to indicate that several weaknesses were found in the subject network. In the top section 1030 in the embodiment of FIG. 10B in the section entitled "Privacy", the privacy score is displayed in green to indicate that the privacy of the subject network is excellent. The colors can correspond to thresholds determined by a user or by, for example, a system controller, such as the system controller 110 of FIG. 1.

In some embodiments, alternatively or in addition, similar scores and corresponding colors can be displayed for fields corresponding to individual or collective IoT devices in a same or a different window of the dashboard 1000. In addition, in some embodiments in accordance with the present principles, other colors can be implemented. Although in FIG. 10B the dashboard 1000 is illustrated as comprising a specific layout (e.g., a lower section, a middle section, a top section and a top most section), in other embodiments, a dashboard in accordance with the present principles can comprise other display layouts.

Figure 10C:
FIG. 10C depicts a GUI, presented as a pop-up window for the dashboard of FIG. 10B, on which suggestions for correcting security and/or privacy concerns can be displayed in accordance with an embodiment of the present principles.

In some embodiment, a GUI can be implemented to suggest corrective actions for weaknesses in IoT devices or a subject IoT network(s) identified in, for example, an IoT network model in accordance with the present principles. For example, FIG. 10C depicts a GUI, presented as a pop-up window for the dashboard 1000 of FIG. 10B, on which suggestions for correcting security and/or privacy concerns can be displayed in accordance with an embodiment of the present principles. In the embodiment of FIG. 10C, a first correction option presented to a user suggests to replace the SmartLock discovered in the subject network of FIG. 10B, with a secure type of SmartLock. In the embodiment depicted in FIG. 10C, a second suggested correction option includes relocating a device, specifically the Kevo SmartLock, to a more secure location, such as an indoor location. In the embodiment depicted in FIG. 10C, a third suggested correction option includes disabling the WiFi on the Kevo SmartLock. In some embodiments, as depicted in FIG. 10C, the suggested corrective action can include an indication of a level of recommendation for the suggested correction action. For example, in FIG. 10C, the corrective action associated with option 1 is rated as good and recommended, the corrective action associated with option 2 is rated as good, and the corrective action associated with option 3 is rated as not recommended. In some embodiments, the suggested corrective actions and associated ratings can be automatically determined by a system controller in accordance with the present principles, such as the system controller 110 of FIG. 1, for example, using all of the information available to the system controller 110 regarding the operating characteristics, representation/map, IoT model and other similar Information for IoT devices or an IoT network(s). In some embodiments, if a user selects a suggested corrective action, an associated IoT network model can be re-generated with the new operating characteristics associated with the change caused by the corrective action and the information in an associated dashboard, such as the dashboard, 1000 of FIG. 10B, is determined anew. The new dashboard including the updated information can be presented to a user to inform a user how the corrective action will affect a subject IoT network and/or IoT devices. If a user is satisfied with the changes caused by the selected corrective action, the corrective action can be actually applied and an IoT network model in accordance with the present principles, can be re-generated to model actual interactions between the IoT devices of a subject IoT network and the IoT network. A new dashboard having the updated values and configurations of the actual IoT network model can then be presented to a user.

Figure 11:
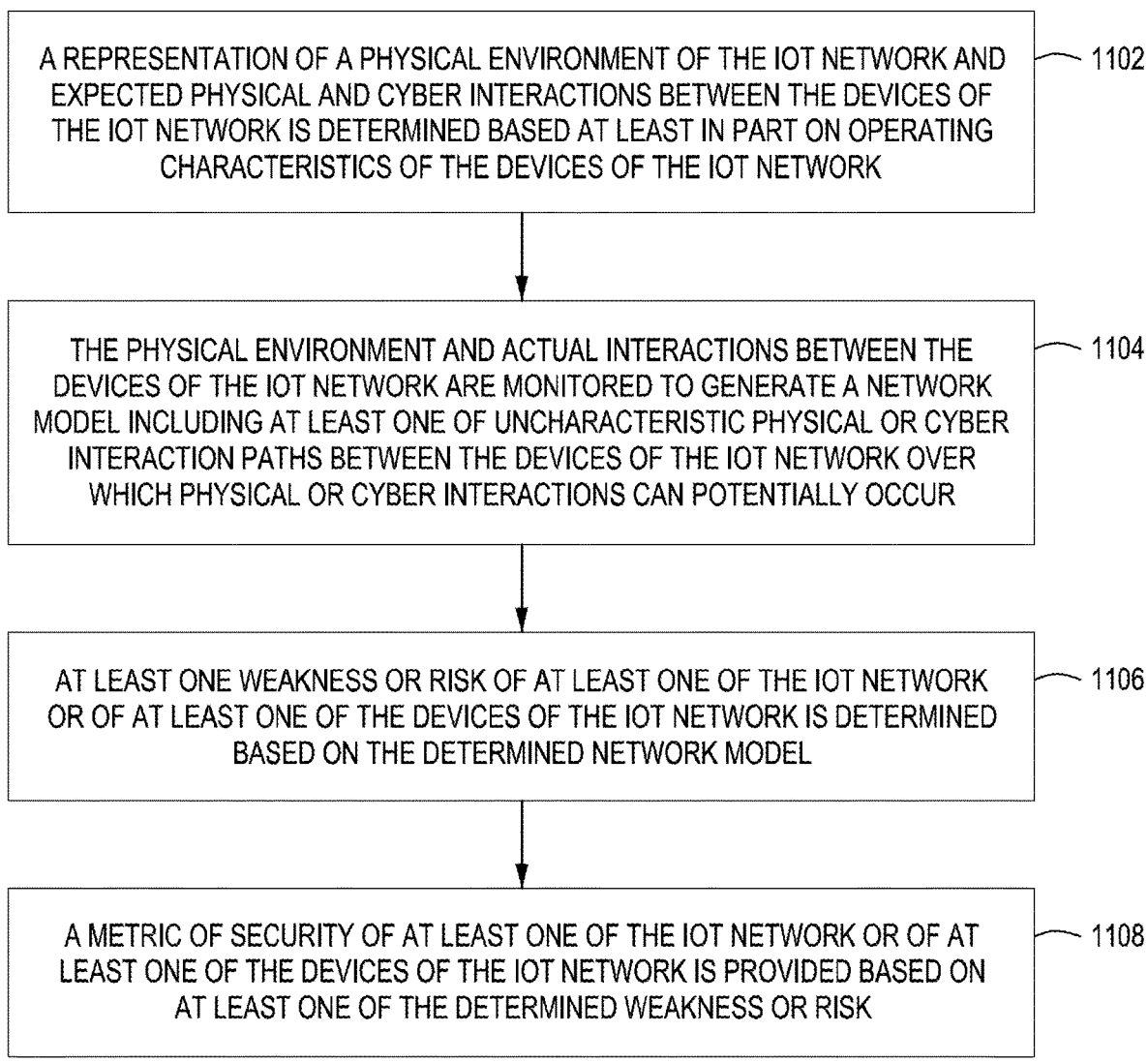
FIG. 11 depicts a flow diagram of a method for determining a weakness or risk for devices of an Internet-of-things (IoT) network in accordance with an embodiment of the present principles.

FIG. 11 depicts a flow diagram of a method 1100 for determining a vulnerability of a network of devices connected to the Internet in accordance with an embodiment of the present principles. The method 1100 of FIG. 11 begins at 1102 during which a representation of a physical environment of the IoT network and expected physical and cyber interactions between the devices of the IoT network is determined based at least in part on operating characteristics of the devices of the IoT network. The method 1100 can proceed to 1104.

At 1104, the physical environment and actual interactions between the devices of the IoT network are monitored to generate a network model including at least one of uncharacteristic physical or cyber interaction paths between the devices of the IoT network over which physical or cyber interactions can potentially occur. The method 1100 can proceed to 1106.

At 1106, at least one weakness or risk of at least one of the IoT network or of at least one of the devices of the IoT network is determined based on the determined network model. The method 1100 can proceed to 1108.

At 1108, a metric of security of at least one of the IoT network or of at least one of the devices of the IoT network is provided based on at least one of the determined weakness or risk. The method 1100 can be exited.

While the foregoing is directed to embodiments of the present principles, other and further embodiments may be devised without departing from the basic scope thereof. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

In the foregoing description, numerous specific details, examples, and scenarios are set forth in order to provide a more thorough understanding of the present principles. It will be appreciated, however, that embodiments of the principles can be practiced without such specific details. Further, such examples and scenarios are provided for illustration, and are not intended to limit the teachings in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Modules, data structures, blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation of the system controller 110.

The invention claimed is:

1. A method for determining a weakness or risk for devices of an Internet-of-things (IoT) network, comprising:
   determining a representation of a physical environment of the IoT network and expected physical and cyber interactions between the devices of the IoT network based at least in part on operating characteristics of the devices of the IoT network;
   monitoring the physical environment and actual interactions between the devices of the IoT network to generate a network model including at least one of uncharacteristic physical or cyber interaction paths between the devices of the IoT network over which physical or cyber interactions can potentially occur;
   comparing the determined representation of the physical environment of the IoT network and the expected physical and cyber interactions between the devices of the IoT network and the network model to determine unexpected interaction paths between devices of the IoT network;
   based on the determined unexpected interaction paths between the devices of the IoT network, determining at least one weakness or risk of at least one of the IoT network or of at least one of the devices of the IoT network; and
   providing a metric of security of at least one of the IoT network or of at least one of the devices of the IoT network based on at least one of the determined weakness or risk.

2. The method of claim 1, wherein the operating characteristics comprise at least one of security policies, device features and capabilities, physical location, proximity to other devices, mobility, time and states or security properties and determining at least one weakness or risk comprises determining a security posture for the IoT network.

3. The method of claim 1, wherein providing a metric of security comprises determining a relative security score for at least one of the IoT network or the devices of the IoT network based on the determined at least one weakness or risk.

4. The method of claim 1, further comprising predicting, using the network model, an effect of adding a new device to the IoT network on the determined at least one weakness or risk of at least one of the IoT network or at least one of the devices of the IoT network based on operating characteristics of the new device.

5. The method of claim 4, further comprising determining a relative security score for the new device based on the affected at least one weakness or risk.

6. The method of claim 1, further comprising comparing the expected physical and cyber interactions between the devices of the IoT network and the monitored, actual interactions between the devices of the network to identify an anomaly.

7. The method of claim 6, wherein the anomaly is representative of at least one of uncharacteristic physical or cyber interaction paths between the devices of the IoT network over which physical or cyber interactions can potentially occur.

8. The method of claim 1, further comprising monitoring at least one output of at least one side channel, including at least one of lights, heat, facial recognition, human interaction, timing details, a power profile, an electromagnetic profile, and acoustic properties, associated with at least one of the Internet devices of the network to identify an anomaly in the at least one output of the at least one side channel associated with the at least one of the devices of the IoT network, wherein the identified anomaly provides an indication that the at least one device associated with the at least one side channel having the identified anomaly is a cause of the at least one uncharacteristic physical or cyber interaction paths between the devices of the IoT network over which physical or cyber interactions can potentially occur.

9. The method of claim 1, further comprising communicating a probe signal, including at least one of a network packet or a side channel input, to at least one of the devices of the IoT network and monitoring an output of the at least one of the devices of the IoT network to determine if the at least one of the devices of the IoT network is a cause of the at least one uncharacteristic physical or cyber interaction paths between the devices of the IoT network over which physical or cyber interactions can potentially occur.

10. The method of claim 1, further comprising determining a cause of the at least one uncharacteristic physical or cyber interaction paths between the devices of the IoT network by using historical observations of a functionality of at least one of the devices of the IoT network.

11. The method of claim 1, wherein the uncharacteristic physical or cyber interaction paths between the devices of the IoT network over which physical or cyber interactions can potentially occur are representative of actual interactions between the devices of the IoT network that are outside of a security policy.

12. The method of claim 1, further comprising comparing the monitored actual interactions between the devices of the IoT network with expected physical and cyber interactions between the devices of the IoT network that are authorized by security policies included in the operating characteristics of the devices of the IoT network to determine the uncharacteristic physical or cyber interaction paths between the devices of the IoT network.

13. The method of claim 1, wherein the operating characteristics of the devices of the IoT network are determined using at least one of sniffers, user input, or information obtained from the at least one of the Internet and the IoT network.

14. The method of claim 1, further comprising providing the metric of security of the IoT network or of at least one of the devices of the IoT network to a user on a graphical user interface.

15. The method of claim 1, wherein a cause of at least one uncharacteristic physical or cyber interaction path between the Internet devices of the network over which physical or cyber interactions can potentially occur comprises a device either (1) not capable of communicating outside of the IoT network, (2) not within the IoT network, or (3) not within a physical space of the IoT network.

16. The method of claim 1, further comprising:
   determining if at least one of the operating characteristics or the actual interactions between the devices of the IoT network has changed; and
   in response to a determined change, re-generating the network model.

17. The method of claim 1, further comprising periodically re-generating the network model to capture dynamic operating characteristics of at least one of the IoT network or the devices of the IoT network.

18. An apparatus for determining a weakness or risk for devices of an Internet-of-things (IoT) network, comprising:
   a processor; and
   a memory coupled to the processor, the memory having stored therein at least one of programs or instructions executable by the processor to configure the apparatus to:
   determine a representation of a physical environment of the IoT network and expected physical and cyber interactions between the devices of the IoT network based at least in part on operating characteristics of the devices of the IoT network;
   monitor the physical environment and actual interactions between the devices of the IoT network to generate a network model including at least one of uncharacteristic physical or cyber interaction paths between the devices of the IoT network over which physical or cyber interactions can potentially occur;
   comparing the determined representation of the physical environment of the IoT network and the expected physical and cyber interactions between the devices of the IoT network and the network model to determine unexpected interaction paths between devices of the IoT network;
   based on the determined unexpected interaction paths between the devices of the IoT network, determine at least one weakness or risk of at least one of the IoT network or of at least one of the devices of the IoT network; and
   provide a metric of security of at least one of the IoT network or of at least one of the devices of the IoT network based on at least one of the determined weakness or risk.

19. The apparatus of claim 18, wherein the apparatus is further configured to generate a graphical user interface to enable information to be communicated between the apparatus and a user.

20. The apparatus of claim 18, wherein the apparatus is further configured to search the Internet or the IoT network for at least information related to the operating characteristics of the devices of the IoT network.

21. A system for determining a weakness or risk for devices of an Internet-of-things (IoT) network, comprising:
   at least one sniffer to determine operating characteristics of the devices of the IoT network; and
   an apparatus comprising a processor and a memory coupled to the processor, the memory having stored therein at least one of programs or instructions executable by the processor to configure the apparatus to:
   determine a representation of a physical environment of the IoT network and expected physical and cyber interactions between the devices of the IoT network based at least in part on operating characteristics of the devices of the IoT network;
   monitor the physical environment and actual interactions between the devices of the IoT network to generate a network model including at least one of uncharacteristic physical or cyber interaction paths between the devices of the IoT network over which physical or cyber interactions can potentially occur;
   comparing the determined representation of the physical environment of the IoT network and the expected physical and cyber interactions between the devices of the IoT network and the network model to determine unexpected interaction paths between devices of the IoT network;
   based on the determined unexpected interaction paths between the devices of the IoT network, determine at least one weakness or risk of at least one of the IoT network or of at least one of the devices of the IoT network; and provide a metric of security of at least one of the IoT network or of at least one of the devices of the IoT network based on at least one of the determined weakness or risk.

22. A non-transitory computer-readable storage device having stored thereon a plurality of instructions, the plurality of instructions including instructions which, when executed by a processor, cause the processor to perform a method for determining a weakness or risk for devices of an Internet-of-things (IoT) network, comprising:

determining a representation of a physical environment of the IoT network and expected physical and cyber interactions between the devices of the IoT network based at least in part on operating characteristics of the devices of the IoT network;

monitoring the physical environment and actual interactions between the devices of the IoT network to generate a network model including at least one of uncharacteristic physical or cyber interaction paths between the devices of the IoT network over which physical or cyber interactions can potentially occur;

comparing the determined representation of the physical environment of the IoT network and the expected physical and cyber interactions between the devices of the IoT network and the network model to determine unexpected interaction paths between devices of the IoT network;

based on the determined unexpected interaction paths between the devices of the IoT network, determining at least one weakness or risk of at least one of the IoT network or of at least one of the devices of the IoT network; and providing a metric of security of at least one of the IoT network or of at least one of the devices of the IoT network based on at least one of the determined weakness or risk.

* * * * *